(12) United States Patent
Condeixa et al.

(10) Patent No.: US 11,044,311 B2
(45) Date of Patent: Jun. 22, 2021

(54) SYSTEMS AND METHODS FOR MANAGING THE SCHEDULING AND PRIORITIZING OF DATA IN A NETWORK OF MOVING THINGS

(71) Applicant: Veniam, Inc., Mountain View, CA (US)

(72) Inventors: Tiago Silvestre Condeixa, Aveiro (PT); Ricardo Jorge Magalhães de Matos, Oporto (PT)

(73) Assignee: VENIAM, INC., Mountain View, CA (US)

( * ) Notice: Subject to any disclaimer, the term of this patent is extended or adjusted under 35 U.S.C. 154(b) by 432 days.

(21) Appl. No.: 15/481,732

(22) Filed: Apr. 7, 2017

(65) Prior Publication Data

US 2017/0339224 A1 Nov. 23, 2017

Related U.S. Application Data

(60) Provisional application No. 62/338,151, filed on May 18, 2016.

(51) Int. Cl.
*G06F 15/173* (2006.01)
*H04L 29/08* (2006.01)
(Continued)

(52) U.S. Cl.
CPC ....... *H04L 67/1095* (2013.01); *H04B 1/3822* (2013.01); *H04L 47/24* (2013.01);
(Continued)

(58) Field of Classification Search
CPC . H04B 1/3822; H04L 47/821; H04L 67/1036; H04L 67/1095; H04L 67/1097; H04L 67/325; H04L 67/327; H04L 47/24; H04L 67/104; H04L 67/1042; H04W 4/02; H04W 76/10; H04W 84/18
See application file for complete search history.

(56) References Cited

U.S. PATENT DOCUMENTS

| | | | | |
|---|---|---|---|---|
| 2007/0206547 A1* | 9/2007 | Gong | | H04L 45/122 |
| | | | | 370/338 |
| 2007/0271396 A1* | 11/2007 | Chen | | H04L 41/0246 |
| | | | | 709/249 |
| 2008/0046978 A1* | 2/2008 | Rieger | | H04L 41/12 |
| | | | | 726/4 |
| 2009/0010258 A1* | 1/2009 | Ayoub | | H04W 72/10 |
| | | | | 370/392 |

(Continued)

FOREIGN PATENT DOCUMENTS

WO 2012128792 9/2012

OTHER PUBLICATIONS

Int'l Search Report and Written Opinion for PCT/US17/32860 dated Jun. 9, 2017 (14 pages).

*Primary Examiner* — Ryan J Jakovac
(74) *Attorney, Agent, or Firm* — McAndrews, Held & Malloy, Ltd.

(57) ABSTRACT

Communication network architectures, systems and methods for supporting a network of mobile nodes. As a nonlimiting example, various aspects of this disclosure provide communication network architectures, systems, and methods for supporting a dynamically configurable communication network comprising a complex array of both static and moving communication nodes (e.g., the Internet of moving things). More specifically, systems and methods for managing the scheduling and prioritizing of data in a network of moving things.

25 Claims, 14 Drawing Sheets

(51) Int. Cl.
*H04L 12/911* (2013.01)
*H04B 1/3822* (2015.01)
*H04W 4/029* (2018.01)
*H04W 76/10* (2018.01)
*H04L 12/851* (2013.01)
*H04W 40/36* (2009.01)
*H04W 28/02* (2009.01)
*H04W 84/18* (2009.01)

(52) U.S. Cl.
CPC .......... *H04L 47/821* (2013.01); *H04L 67/325* (2013.01); *H04W 4/029* (2018.02); *H04W 28/0236* (2013.01); *H04W 40/36* (2013.01); *H04W 76/10* (2018.02); *H04L 67/1036* (2013.01); *H04L 67/1097* (2013.01); *H04L 67/327* (2013.01); *H04W 84/18* (2013.01)

(56) References Cited

U.S. PATENT DOCUMENTS

| | | | |
|---|---|---|---|
| 2013/0157692 A1* | 6/2013 | Hall | H04L 12/1845 455/456.3 |
| 2013/0211870 A1 | 8/2013 | Lawson et al. | |
| 2014/0240089 A1* | 8/2014 | Chang | G07C 9/00111 340/5.61 |
| 2015/0350031 A1 | 12/2015 | Burks et al. | |
| 2016/0065405 A1* | 3/2016 | Wang | H04W 56/001 370/254 |
| 2016/0182365 A1* | 6/2016 | Chang | H04L 45/02 370/352 |
| 2016/0277391 A1* | 9/2016 | Choyi | H04L 63/06 |
| 2017/0064745 A1* | 3/2017 | Kephart, Jr. | H04W 76/10 |
| 2019/0090174 A1 | 3/2019 | Rocci et al. | |

* cited by examiner ered in this description in connection with the drawings.

SYSTEMS AND METHODS FOR MANAGING THE SCHEDULING AND PRIORITIZING OF DATA IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/338,151, filed on May 18, 2016, and titled "Systems and Methods for Managing the Scheduling and Prioritizing of Data in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/257,421, titled "Systems and Methods for Delay Tolerant Networking in a Network of Moving Things," filed Nov. 19, 2015; U.S. Provisional Application Ser. No. 62/299,269, titled "Systems and Methods for Automating and Easing the Installation and Setup of the Infrastructure Supporting a Network of Moving Things," filed on Feb. 24, 2016; U.S. Provisional Application Ser. No. 62/338,135, titled "Systems and Methods for Managing the Routing and Replication of Data in the Upload Direction in a Network of Moving Things," filed on May 18, 2016; U.S. Provisional Application Ser. No. 62/338,151, titled "Systems and Methods for Managing the Scheduling and Prioritizing of Data in a Network of Moving Things," filed on May 18, 2016; and U.S. Provisional Application Ser. No. 62/338,157, titled "Systems and Methods for Managing the Storage and Dropping of Data in a Network of Moving Things," filed on May 18, 2016, each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
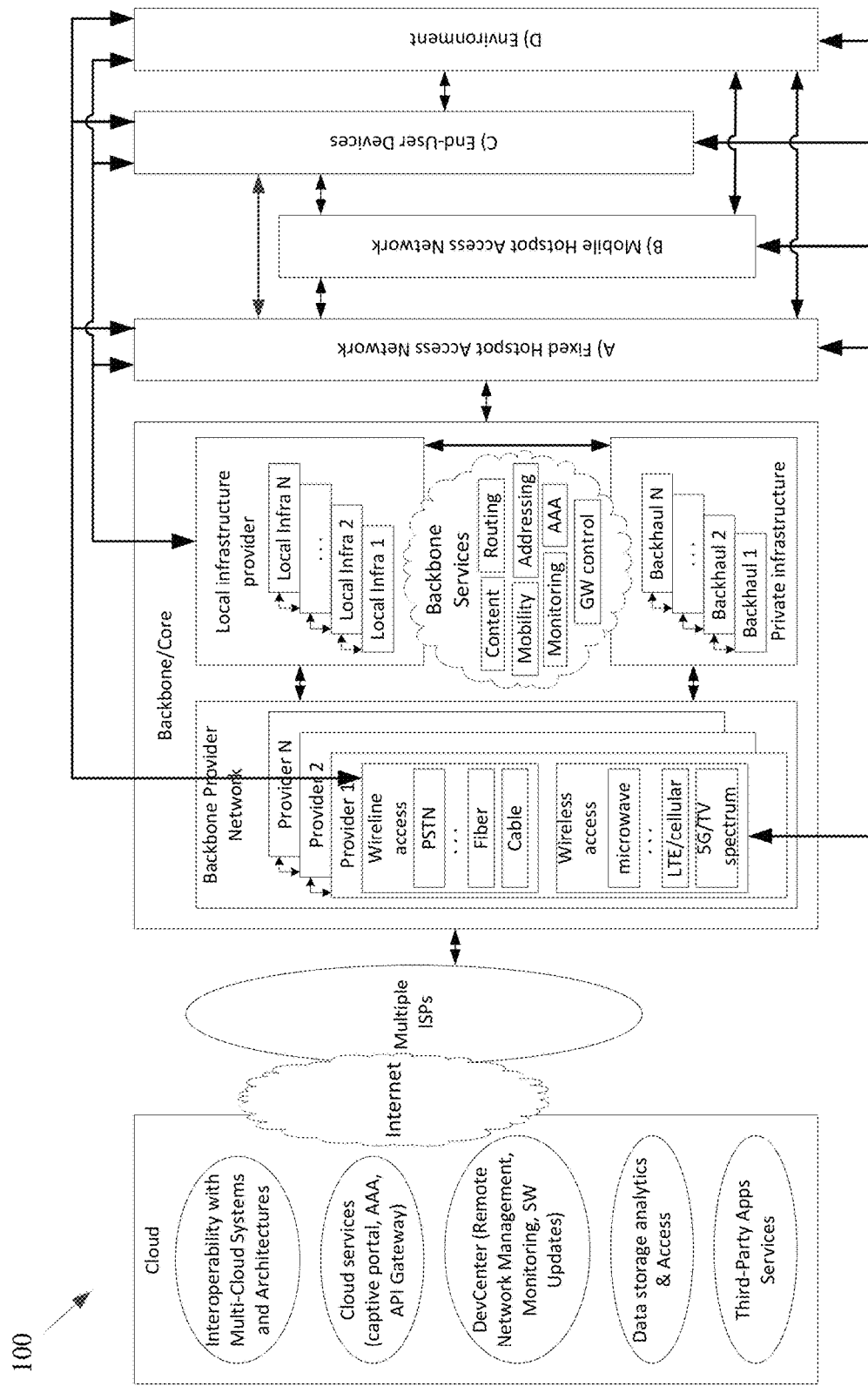
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
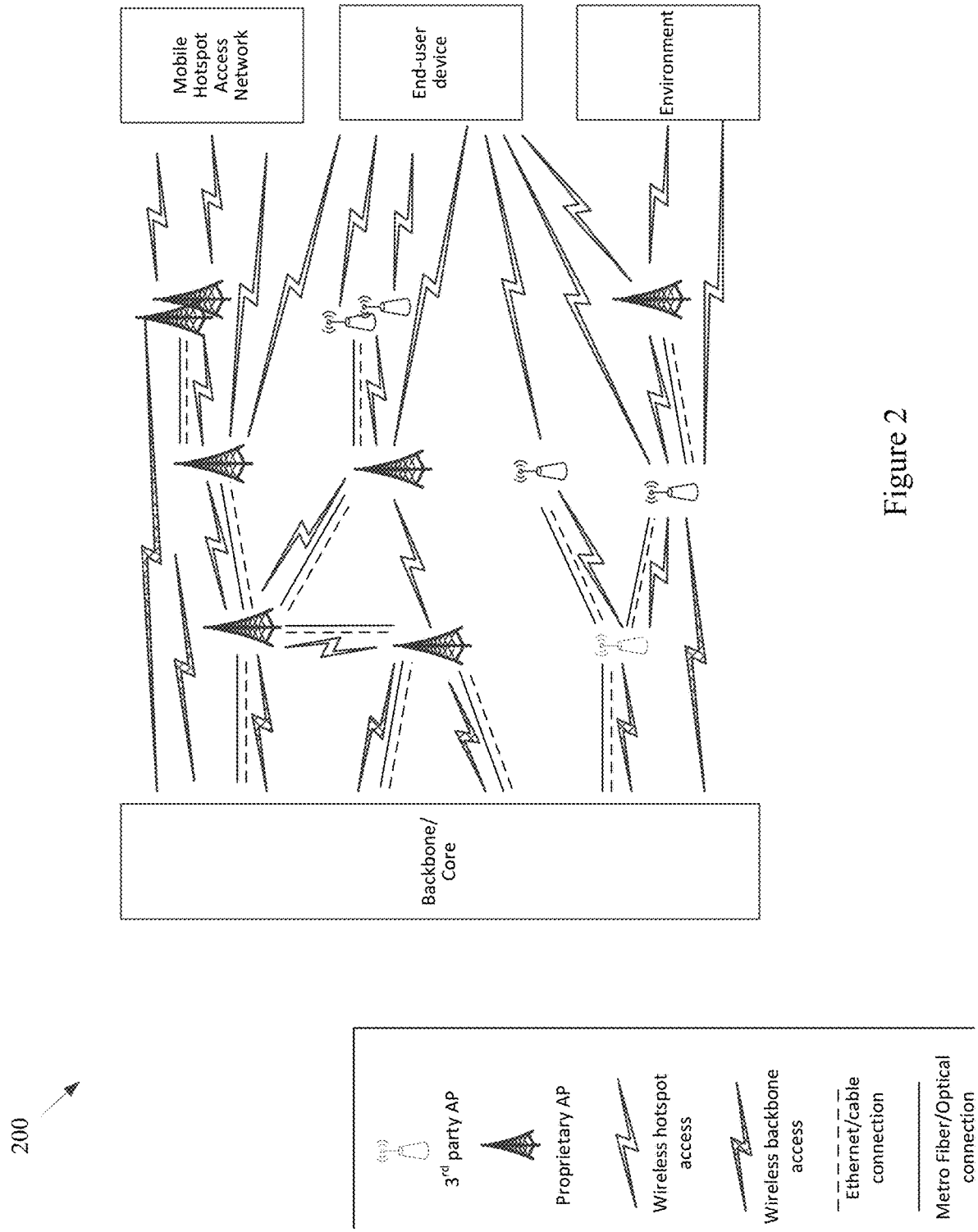
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
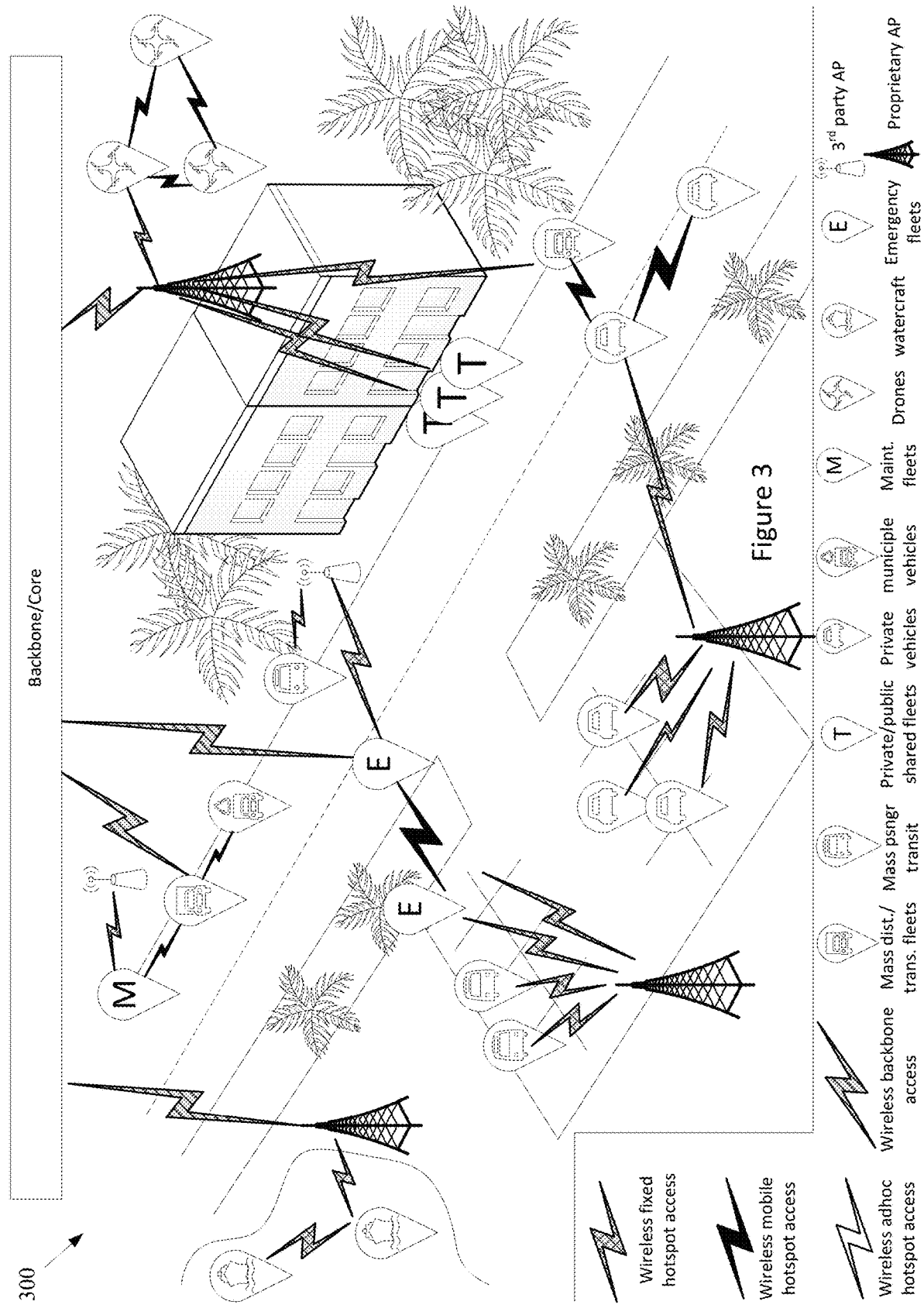
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
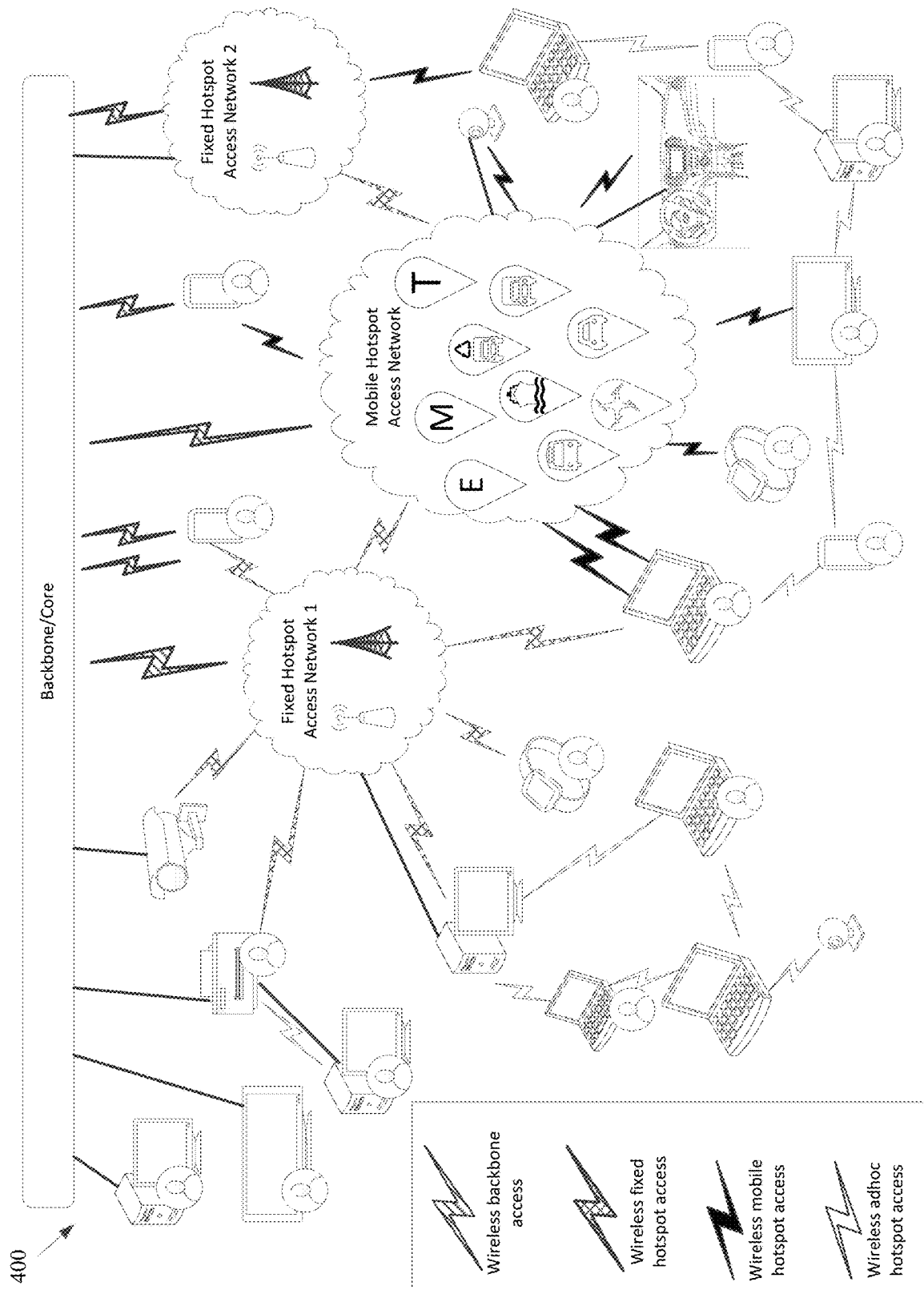
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
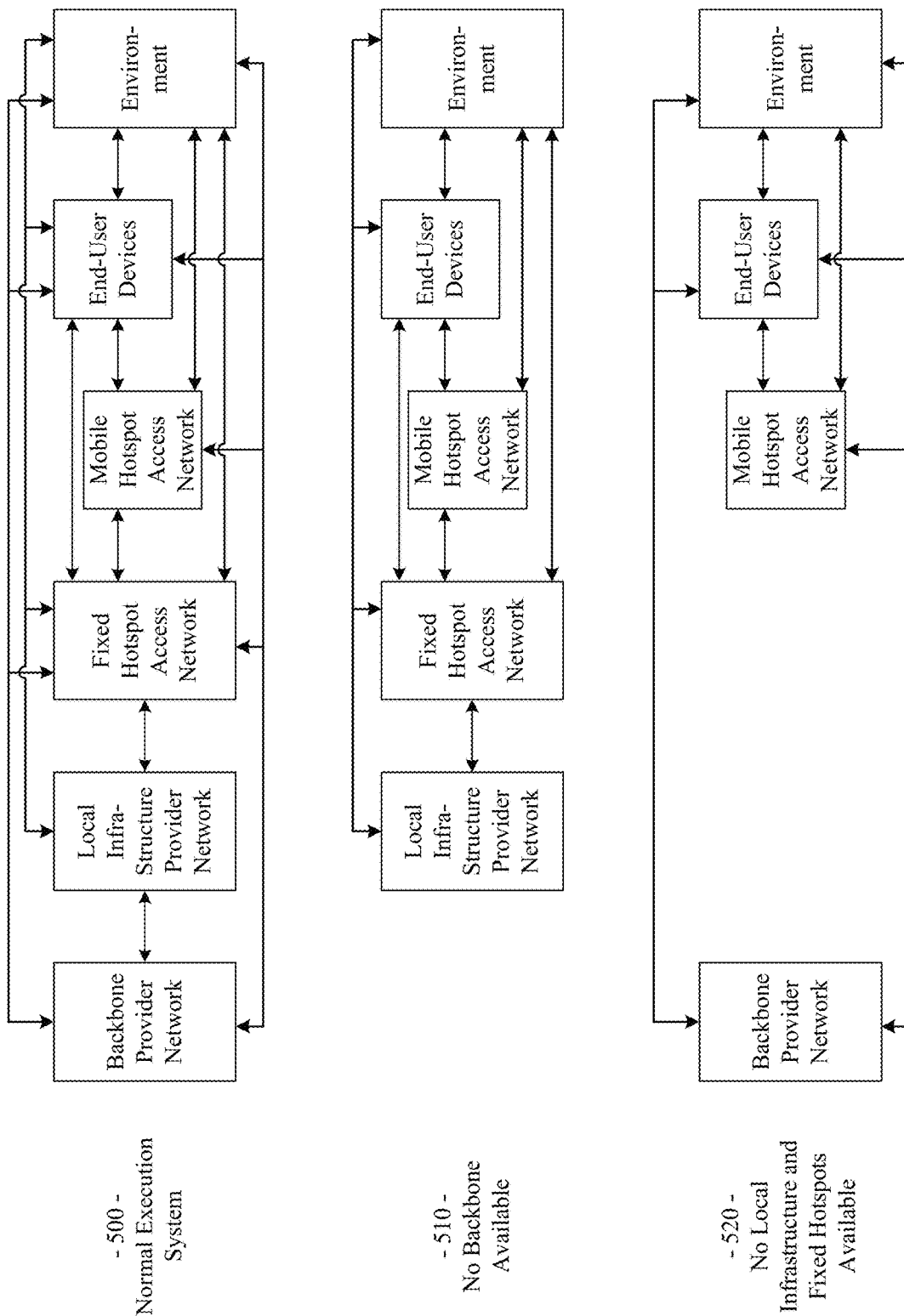
FIGS. 5A-5C show a plurality of network configurations illustrating the flexibility and/or and resiliency of a communication network, in accordance with various aspects of this disclosure.
Figure 5B:
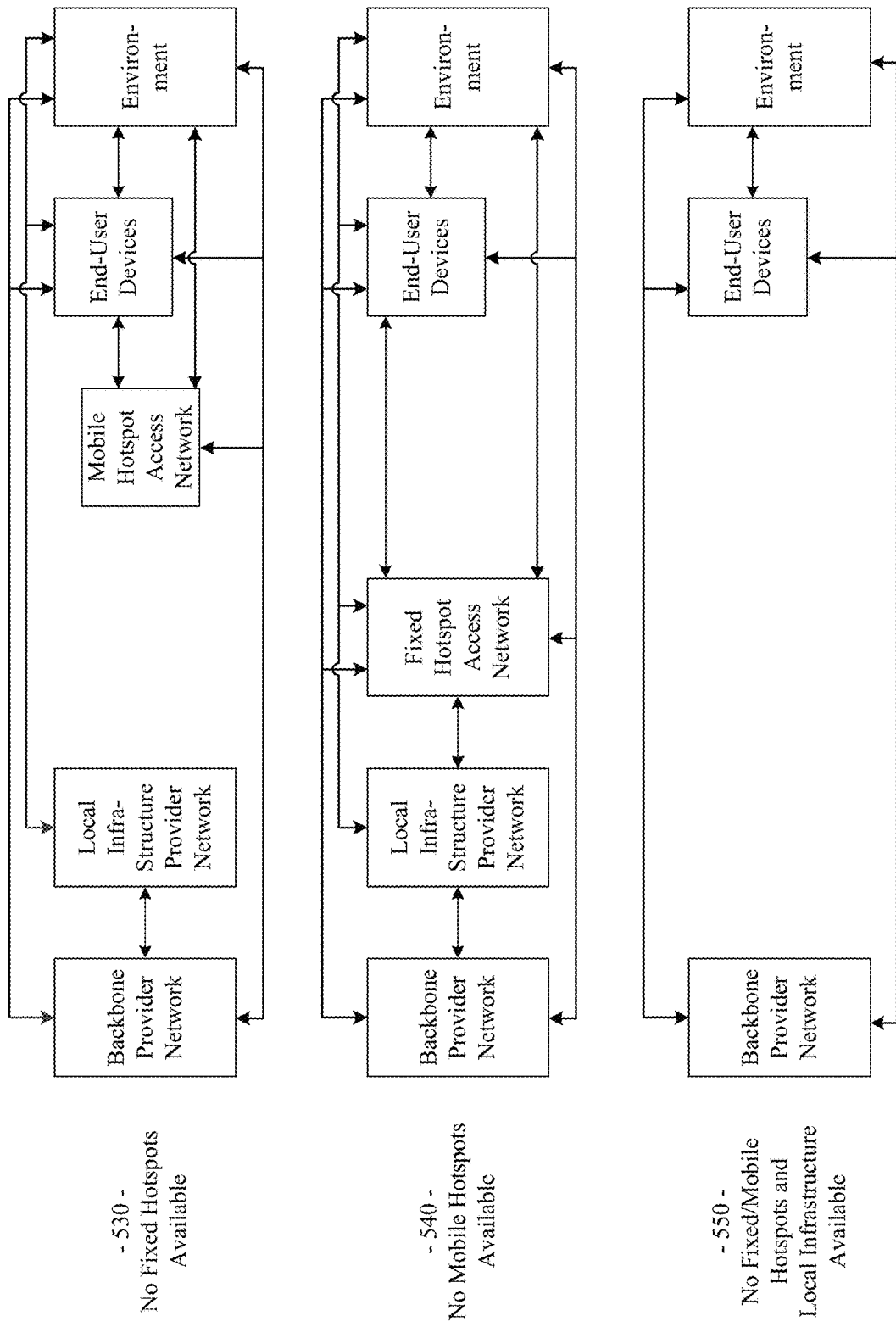
Figure 5C:
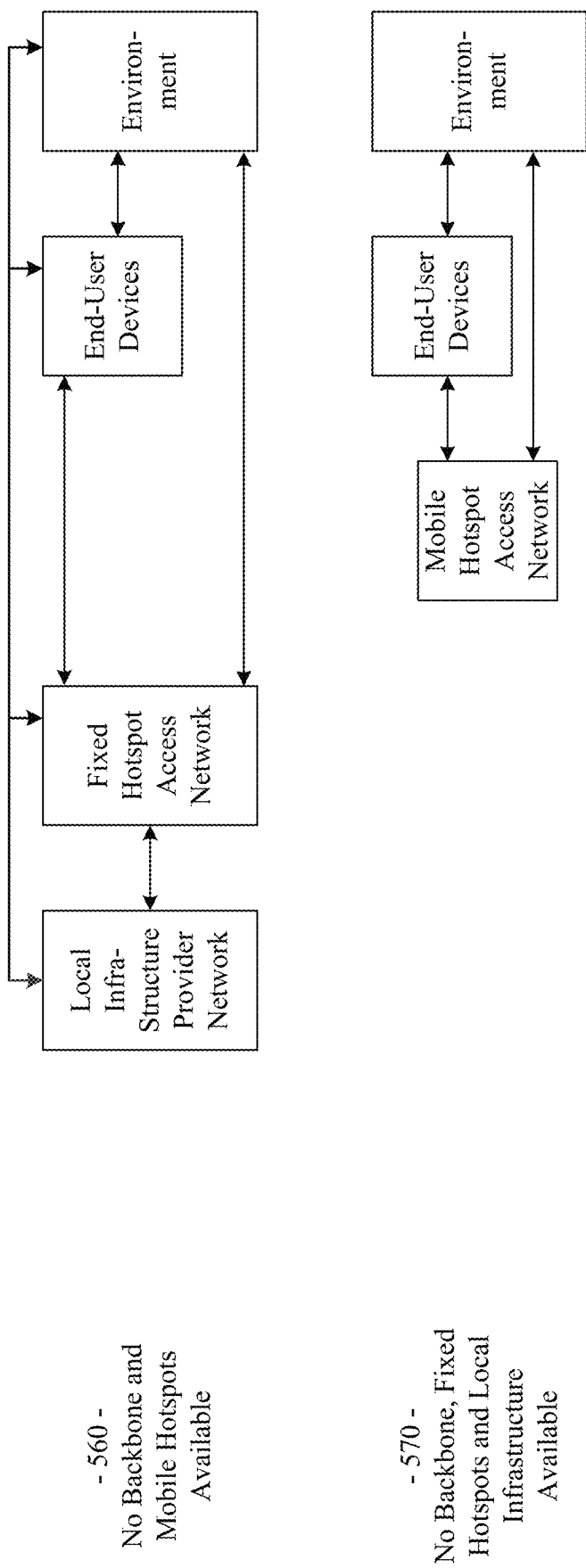

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
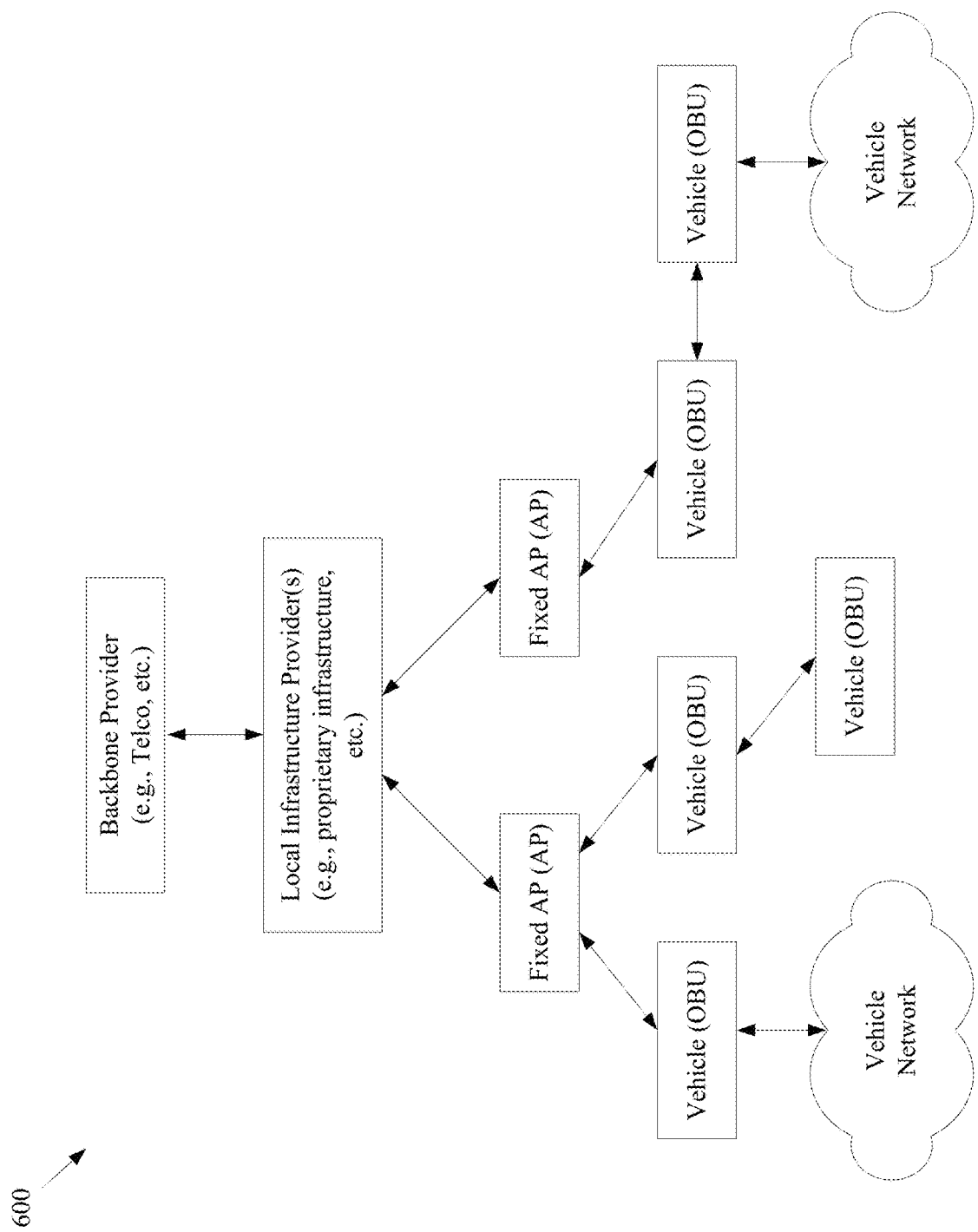
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

There is an ever growing amount of data generated throughout the huge variety of connected devices in the network of moving things. Aspects of this disclosure provide for cost-effective retention and dissemination of such data through the vehicular network infrastructure, while meeting the QoS needs of the applications/services that use such data. Such applications/services may be located in the Cloud, may be provided by network nodes (e.g., mobile or fixed access points (MAPs or FAPs), or may be run by the end-user devices connected to the APs. As used herein, "data retention and dissemination rules" may be used to govern where (i.e., in which network nodes and/or which storage devices of which network nodes), when (i.e., at what times and/or for how long), and/or how (i.e., in what format or form of organization (e.g., compressed, non-compressed, structured as "objects", unstructured files, etc.), via which type(s) of network communication link(s) (e.g., Wi-Fi (e.g., IEEE 802.11a/b/g/n/ac/ad/ad), cellular (e.g., 3G, 4G, LTE, GSM, CDMA, etc.)) data is: routed, stored, dropped, replicated, shared, prioritized, scheduled, and/or the like, in the upstream and/or downstream directions. As used herein, the term "bundle" may be used to refer to a block/package/unit of data (e.g., comprising one or more fragments of data from one or more files from one or more sources) sent between a first network node and a second network node. A bundle may comprise a single packet (e.g., an IP packet) or may be a set of such packets that belong to the same piece of data. It should be noted that while the length of a packet may, for example, be defined in terms of a Maximum Transfer Unit (MTU) number of bytes (e.g., 1500 bytes in some networks), a bundle may be made up of one or more packets, depending upon the amount of data to be transferred from the sending network node to a receiving network node. In accordance with various aspects of the present disclosure, a bundle may be split at the sending node and aggregated again at the receiving node.

The highly mobile and constantly changing nature of mobile APs can make it difficult to communicate large amounts of data to and from the mobile APs in a timely and cost-efficient manner. Accordingly, various aspects of this disclosure enable taking advantage of the intermittent contacts that may occur among mobile APs and between mobile APs and fixed APs, in order to reduce the cost of storing and transferring the data. By taking advantage of aspects of this disclosure, the data can be better balanced among mobile APs, thus reducing the amount of storage capacity required of the mobile APs, while still meeting latency/QoS requirements of the end-users of the data and reducing reliance on expensive (e.g., cellular) data connections. For example, a mobile AP that does not frequently connect to any fixed APs may be forced to resort to, for example, a cellular data connection to enable the mobile AP to reach a resource or system located in, for example, the Cloud/Internet. Aspects of the present disclosure, however, enable such mobile APs to communicatively couple to other mobile AP(s) that more-frequently connect to one or more fixed AP(s), thus enabling those APs to reach the Internet/Cloud without having to resort to a more costly (e.g., cellular) data connection.

Aspects of this disclosure provide various methods and systems that may be used to optimize (e.g., in terms of overhead such as cellular network usage, amount of network congestion introduced, number of data connections established, etc.) the flow of data between mobile APs both in the upstream and downstream directions.

In an example implementation, a sending node of a network as described herein (e.g., a mobile AP) may broadcast a bundle to be received by one or more neighboring nodes of the network (e.g., MAPs and/or FAPs within wireless communication range of the sending MAP). Each of those neighboring nodes may then decide, based upon context information available to the respective neighboring node, whether or not to store the received bundle, and whether or not to acknowledge the receipt of the bundle to the sending node.

In accordance with aspects of the present disclosure, the sending mobile AP may decide, based on context information available to the sending MAP, whether or not to replicate a bundle to one or more of its neighboring nodes using, for example, unicast messages (addressed to a single receiver), and if so, whether or not to wait for acknowledgement of the unicast message by the neighboring node. Thus, in such an implementation, the decision/knowledge regarding how to handle the bundle is centralized at the sender.

In a network according to aspects of the present disclosure, one or more nodes of the network (e.g., devices such as mobile APs, fixed APs, Delay Tolerant Network/Disruption Tolerant Network (DTN) servers, etc.) may advertise information about one or more bundles that the one or more network nodes are currently storing (e.g., by sending unicast, multicast, and/or broadcast messages into the network). Such advertised information may include, for example, the type of data in the bundle(s), the size of the bundle(s), whether the network node is trying to send the bundle(s), the destination of the bundle(s), etc. Other network nodes receiving such advertisements may then use context information available to the other network nodes to decide whether the other network nodes want/need the bundle(s), and/or whether the other network nodes can accept receipt of the bundle(s) for subsequently forwarding to yet another network node.

In accordance with various aspects of the present disclosure, one or more nodes of the network (e.g., devices such as mobile APs, fixed APs, DTN servers, etc.) may advertise information about one or more bundle(s) that they are currently in need of or want to receive (e.g., by sending unicast, multicast, and/or broadcast messages into the network). Other network nodes receiving such advertisements may then use context information available to the other nodes to decide whether they are in possession of the wanted/desired bundle(s), and, if so, whether the other nodes can and/or should agree to deliver the bundles to the node advertising the need/want.

In a network according to aspects of the present disclosure, network nodes (e.g., mobile APs or other devices) may establish what may be referred to herein as a "control channel" with one or more fixed APs and/or the Cloud, in order to gather context information that may be used in selecting and implementing data dissemination and retention rules.

In a network as described herein, for communication in the "upstream" direction (i.e., in which the Internet/Cloud is the end destination), many or all of the nodes of the network may attempt to send data to the same destination (e.g., DTN server), whereas communication in the "downstream" direction (i.e., from the Internet/Cloud to the APs) may involve the use of "flooding" mechanisms to distribute data to the nodes of the network. Accordingly, in such a network, a first set of one or more data dissemination and retention rules may be used for the "upstream" communication, and a second, possibly different, set of one or more data dissemination and retention rules may be used for "downstream" communications. Such data dissemination and retention rules may be a part of configuration information distributed to the nodes of a network according to the present disclosure. Additional information about the distribution of such configuration information may be found, for example, in U.S. patent application Ser. No. 15/138,370, titled "Systems and Methods for Remote Configuration Update and Distribution in a Network of Moving Things," filed Apr. 26, 2016, the complete subject matter of which is hereby incorporated herein, in its entirety.

In a network according to various aspects of the present disclosure, the context information used by a particular network node at any particular time may comprise, by way of example and not limitation, characteristics of the particular node (e.g., the network or geographic location, speed, direction, path of travel, uptime, hardware configuration, software configuration, and/or the like); characteristics of data to be sent or received by the particular node (e.g., the size, QoS requirements, and/or the like) that may include, for example, bundle context information. In accordance with aspects of the present disclosure, bundle context information may comprise, for example, a priority of one or more bundles of data, an age in the network of one or more bundles of data, an amount of time to live of one or more bundles of data, and/or a total number of copies of each specific bundle of one or more bundles of data currently residing within nodes of the network, to name just a few examples. Context information may also comprise characteristics of any wireless link(s) available for communicating the data (e.g., maximum available bandwidth, currently available bandwidth, amount of congestion, error rate, etc.).

The context information used by the particular network node may also comprise, for example, characteristics of neighbor device(s) such as, for example, the speed, direction, and/or path of travel of each neighbor; the type and/or amount of data storage available on each neighbor; an operator of each neighbor; and/or the like, where the neighbor(s) may comprise one or more mobile APs, fixed APs, cellular base stations, and/or end-user devices. In addition, the context information used by the particular network node may comprise, by way of example and not limitation, characteristics of the environment of the particular network node such as, for example, a number/density of nodes present within a determined region or area surrounding the network node; an amount of wireless interference or activity present in an area around the network node; the presence/size/location/etc. of physical obstructions that may affect the particular network node (e.g., whether line-of-sight vs. non-line-of-sight communication is possible); and/or an expected time until being in-range of a fixed AP, and/or the like).

In accordance with various aspects of the present disclosure, such context information may be provided by, for example, devices in the Internet/Cloud, mobile APs of the vehicular network, fixed APs of the vehicular network, sensors of the vehicular network, and/or end-user devices of the vehicular network. For example, one or more of these network nodes and/or devices may probe the network and may provide context information in real time.

As a few, non-limiting examples, context information used by a particular node for a particular bundle may comprise the number of replicas of the particular bundle that currently exist in the network; a probability that the particular node can wirelessly communicate with a particular neighbor node (e.g., without using a cellular connection); a probability that the particular node can communicate with any neighbor node; and/or a probability that the particular node will be at or in proximity to a particular geographic location within some determined time interval (e.g., for nodes that are mobile). Context information used by the particular node for a particular bundle may also comprise, for example, a probability that the particular node will be able to wirelessly connect to a fixed AP (e.g., based on its current geographic location, historical information of the geographic location of the particular node, and/or the geographic location(s) of one or more fixed APs of the network). In addition, context information used by the particular node for a particular bundle may also comprise, for example amount of unused storage in the particular node; an amount of unused storage in one or more neighboring nodes; a number of missing fragments of a specific file that are needed in order to decode the entire file; a "time-to-live" for the particular bundle; a latency tolerance of the particular bundle; a number of hops the bundle has traversed and/or should traverse; and/or a past, present, and/or predicted future number of nodes that have been/are/will be neighbor nodes of the particular node. The term "time-to-live" may be used herein to refer to a maximum amount of time that a bundle is allowed to be in transit within the network before an action is taken to delete the bundle from each node of the network. In accordance with various aspects of the present disclosure, a bundle may, for example, contain a "date/time of creation" (e.g., 15:30 Feb. 2, 2017 UTC) and a "time-to-live" (e.g., 3600 seconds or 60 minutes). In an alternate instance according to the present disclosure, each bundle may, for example, contain a "date-to-live" or "expiration date" (e.g., 16:30 Feb. 2, 2017 UTC), which may define a date/time when the bundle is no longer valid. Using such information, a network node (e.g., a mobile AP, fixed AP, NC, sensor, etc.) may calculate, using current date/time information from, for example, a GNSS/GPS receiver or a Network Time Protocol (NTP) server, whether the bundle is valid. In accordance with aspects of the present disclosure, a "time-to-live" or "date-to-live" may provide for a bundle life of, for example, up to 60 seconds, up to an hour, or as much as a day.

Various aspects of this disclosure enable prioritizing and/or scheduling communication and/or delivery of a bundle based on a "time-to-live" of the bundle, an indication of priority and/or importance of the bundle, an indication of latency sensitivity of the bundle, and/or other characteristics of the bundle. A network in accordance with aspects of the present disclosure includes methods and systems for scheduling bundles carrying real-time data that is to be communicated with highest priority.

Various aspects of the present disclosure provide methods and systems for dealing with a variety of characteristics of different types of storage systems which may be in use at the nodes (e.g., FAPs, MAPs, NCs, sensor(s)) of the network. By way of example and not limitation, the context information may include storage capacity, read/write speed, organization, etc. of storage devices and file systems from which the data will be read and/or to which the data will be stored. For example, some storage systems of a network node may comprise hard disk drives, and some may comprise solid state devices (e.g., FLASH-based or battery backed RAM). Some storage in network nodes may, for example, be organized as file-based storage, some may be organized as object-based storage, and some may use other types of organization/structure.

In accordance with various aspects of the present disclosure, data compression may be applied to a particular bundle at a particular time, and the algorithms for such data compression may be determined based on context information. For example, the data compression algorithm employed, the target compression ratio, and other aspects, may be determined based on the type of data contained in the bundle. By way of example and not limitation, the data contained in a bundle may be characterized by metadata such as a file extension that associates the data with a particular software application, by latency sensitivity of the bundle, by a "time-to-live" of the bundle, by a type of network connection over which the bundle is to be communicated, to name only a few characteristics that are contemplated.

In a network according to aspects of the present disclosure, context information may be used to determine which bundles a network node (e.g., FAPs, MAPs, NCs, etc.) is to drop/delete/overwrite in order to maintain a sufficient quality of service (QoS). Whether a particular network node stores or drops a particular bundle may depend upon, by way of example and not limitation, one or more indicators of the urgency, delay-sensitivity, loss-tolerance, and/or "time-to-live" of the bundle; an amount of bandwidth available on communication links to/from the network node currently handling the bundle, and/or an amount or type of storage available in the node handling the bundle. In addition, if a decision is made to store the particular bundle at the particular node (e.g., based on any of the context information discussed herein), the duration of time for which the particular bundle should be stored at the particular node may be determined based on any of the context information described herein.

A node of a network according to aspects of the present disclosure (e.g., a fixed AP, mobile AP, network controller) may, for example, be configured to predict the impact of various possible data dissemination and retention rules, to assess which rule(s) will be the best, or at least a suitable choice. Such a prediction may be based, for example, on context information advertised by the Cloud, by fixed APs, by mobile APs, by sensors, and/or by end-user devices. In accordance with some aspects of the disclosure, such predictions may be based on context information collected and/or derived from previous surveys and/or analyses performed in a network context similar to the context that a mobile AP is currently experiencing, or may be predicted to experience in the near term. Some example characteristics used in making such predictions may include, by way of example and not limitation, a network or geographic location, a measure of density of mobile APs, a measure of density of fixed APs, obstructions that may impact wireless communication, requirements set by the end-users of the data being communicated, to name just a few.

Methods and systems in accordance with aspects of this disclosure may use hysteresis and/or other techniques to reduce frequency of switching between different data retention and dissemination rules, so as to avoid oscillations that may occur between different rules, and to reduce any computational and/or resource costs of managing the data dissemination and retention rules. For example, switching to a different data retention and dissemination rule may involve arriving at a consensus of a defined set of nodes (e.g., one or more nodes in the same geographic region or same cluster).

Aspects of this disclosure enable gathering data from multiple and heterogeneous sources in a network of moving things, while taking into account the limited resources (e.g., CPU computing capacity, data storage capacity and types, operating power, etc.) of many of the nodes that are part of the network, to ensure that software applications that use the gathered data receive it in accordance with their QoS expectations. Aspects of this disclosure provide a network that is scalable, reliable, and that provides high-performance support for the gathering, transportation, dissemination, and sharing of information among different network elements, while ensuring selection of suitable trade-offs between the various requirements of all the software applications and services that make use of such data.

In a network as described herein, data storage/retention and dissemination rules may comprise various parameters which may be dynamically configured/adapted. Changing one or more such parameter values is referred to herein as changing the data storage/retention and dissemination rule or switching between different data storage and dissemination rules. As previously noted, a network in accordance with aspects of the present disclosure may have multiple sets of data storage/retention and dissemination rules for communication of data traffic in "upstream" and "downstream" directions. Some examples of such parameters include, but are not limited to, a maximum number of replicas (i.e., copies) that should be generated for a bundle at a network node, a maximum number of hops (i.e., communication paths or links) onto which to replicate a particular bundle, priorities of various data types, priorities of various senders of bundles, priorities of various recipients of bundles, whether or not a recipient of a bundle is to send an acknowledgement (ACK) of receipt of the bundle, and whether a node is to use broadcast, multicast, and/or unicast in communicating a bundle. Additional details regarding the handling of bundles in the "upstream" and "downstream" directions may, for example, be found, respectively, in U.S. patent application Ser. No. 15/456,441, titled "Systems and Methods for Managing the Routing and Replication of Data in the Upload Direction in a Network of Moving Things," filed on Mar. 10, 2017, and U.S. patent application Ser. No. 15/478,181, titled "Systems and Methods for Managing the Routing and Replication of Data in the Download Direction in a Network of Moving Things," filed on Apr. 3, 2017, the contents of each of which is hereby incorporated herein by reference, in its respective entirety.

Figure 7:
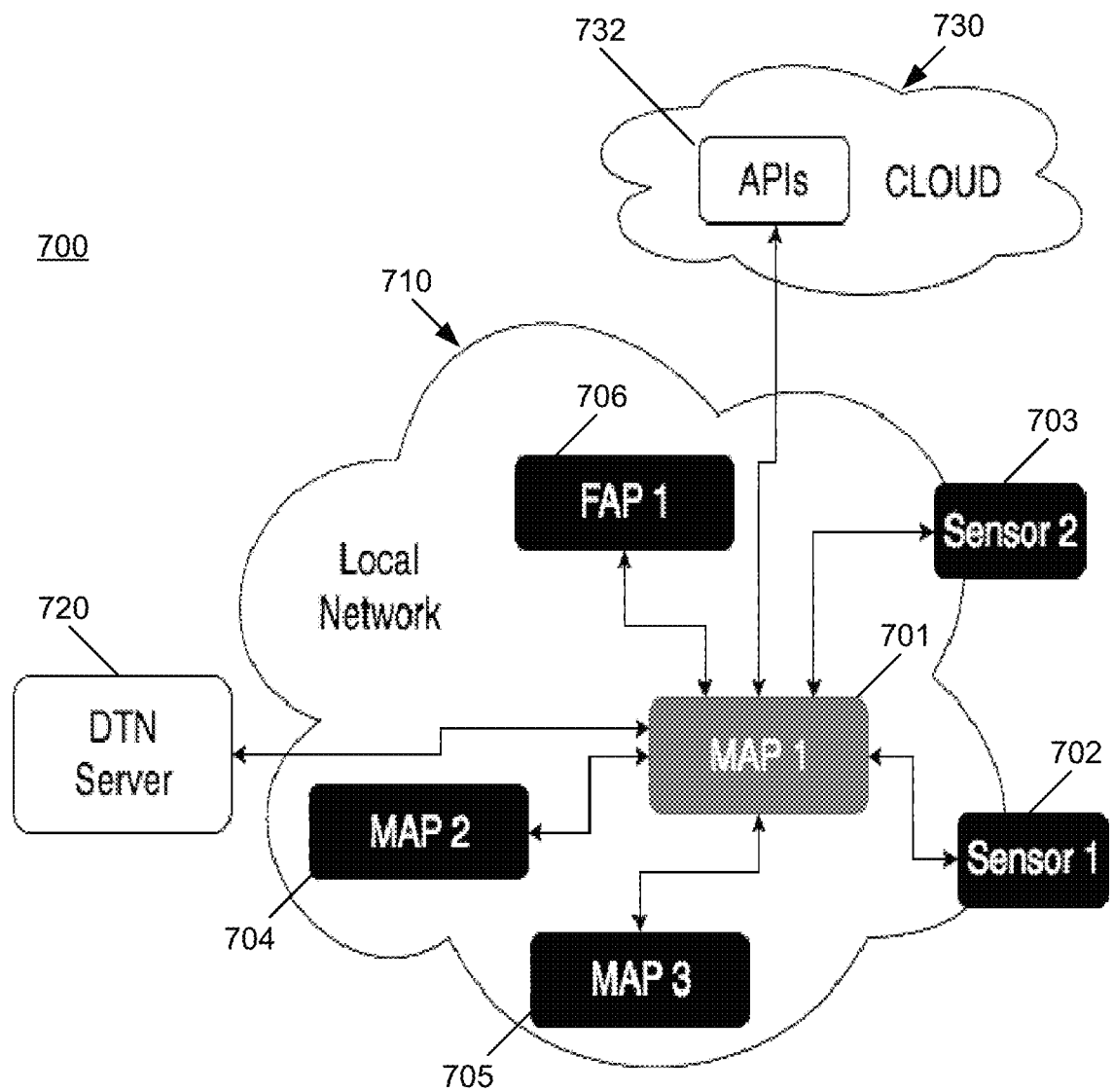
FIG. 7 shows a block diagram of an example mobile AP in a network of moving things, in accordance with various aspects of the present disclosure.

FIG. 7 shows a block diagram of an example mobile AP 701 in a network of moving things 710, in accordance with various aspects of the present disclosure. In the example shown in FIG. 7, the mobile AP MAP 1 701 is configured to communicate with a delay tolerant networking (DTN) server 720 and a set of application programming interfaces 732 of a Cloud 730, to implement data retention and dissemination rules as described herein. Functionality (e.g., circuitry, logic, and/or executable instructions) supporting delay tolerant networking in accordance with this disclosure may, for example, be integrated into one or more APs (e.g., mobile APs and/or fixed APs) or other nodes of the network 710 including, for example, one or more Cloud-based servers (e.g., the DTN server 720 shown in FIG. 7). The MAP 1 701 of the network 710 is also communicatively coupled to a sensor 1 702 and sensor 2 703, a fixed AP FAP 1 706, and mobile APs MAP 2 704 and MAP 3 705. In the example arrangement of FIG. 7, the functionality of the DTN server 720, the mobile APs MAP 1 701, MAP 2 704, and MAP 3 705; and the fixed AP FAP 1 706 manage and implement data storage and dissemination rules for the upstream transfer (i.e., "uploading") of data from the APs (e.g., the FAP 1 706, MAP 1 701, MAP 2 704, and MAP 3 705) to the DTN server 720, and for the "downstream" transfer (i.e., "downloading" or distribution) of data from the DTN server 720 to the APs (e.g., the FAPs and MAPS). For example, in accordance with various aspects of the present disclosure, the DTN functionality of the mobile AP MAP 1 701 of FIG. 7 may, for example, be fed with context information from the current neighbors of the mobile AP MAP 1 701 (i.e., FAP 1 706, MAP 2 704, MAP 3, Sensor 1 702, and Sensor 2 703), and with context information from the Cloud and the DTN server 720.

Figure 8:
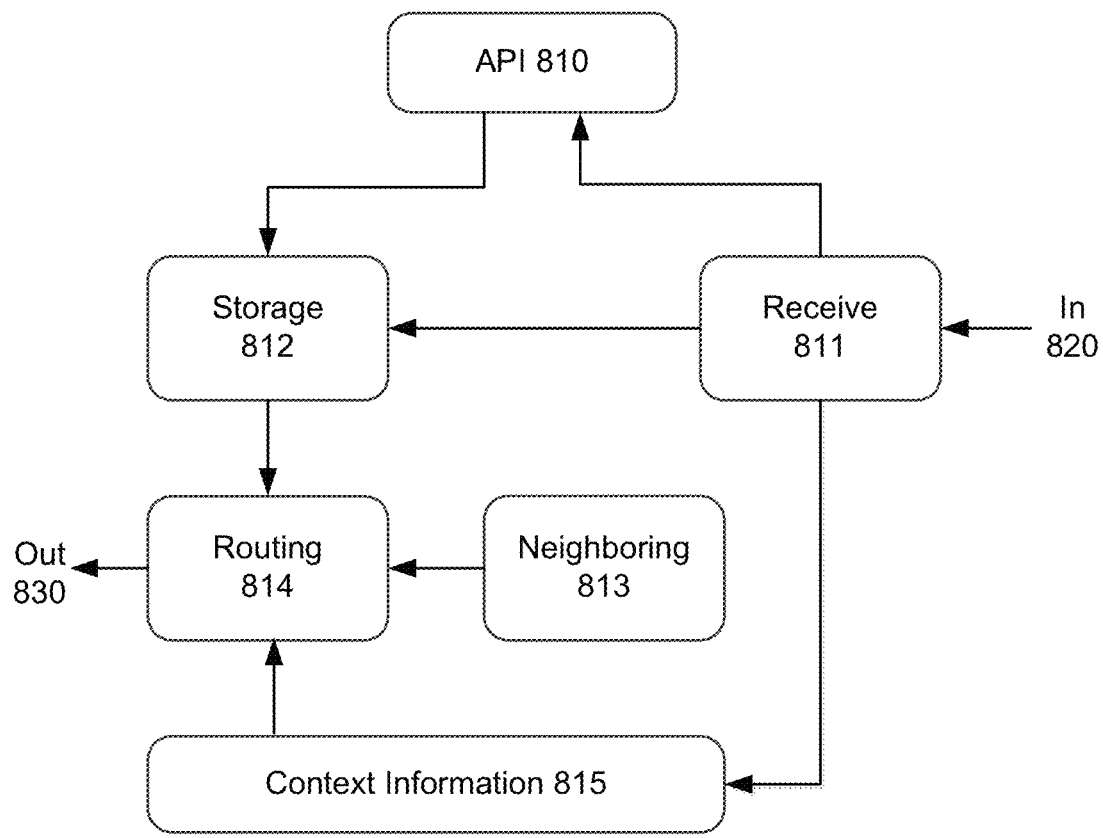
FIG. 8 shows a block diagram of example delay tolerant networking functionality for implementing data retention and dissemination rules of nodes of a network of moving things, in accordance with various aspects of the present disclosure.

FIG. 8 shows a block diagram of example delay tolerant networking functionality 800 for implementing data retention and dissemination rules of nodes of a network of moving things, in accordance with various aspects of the present disclosure. The DTN functionality 800 illustrated in FIG. 8 comprises an API functional block 810, a receive functional block 811, a storage functional block 812, a neighboring functional block 813, a routing functional block 814, and a context information functional block 815. It should be noted that the functionality of the various blocks of FIG. 8 may be realized in hardware/circuitry, executable instructions/software code, logic, and/or any combination of the above.

The neighboring functional block 813 of FIG. 8 is configured to maintain an updated list of all neighbor nodes of the network node containing the functionality of FIG. 8. Such a list of neighbor nodes may contain data items/entries for each neighbor node, where the data items/entries for each neighbor node may include any of the context information discussed above with respect to neighbor nodes. For example, such a list entry for a neighbor node may include, by way of example and not limitation, the type of the neighbor node (e.g., FAP, MAP, Sensor, NC, etc.); the geographic location of the neighbor node (e.g., latitude/longitude); the speed, direction, and/or a path of travel of the neighbor node (i.e., for neighbor nodes that are MAPs); as well as other context information such as a received signal strength indication (RSSI) for the neighbor node. The neighboring functional block 813 may interact with, for example, an operating system of the node in which the functionality of FIG. 8 resides, to obtain information about the available neighbors of the node, such as mobile and fixed APs, Wi-Fi neighbors, or neighbors in other technology (e.g., Bluetooth, DSRC, etc.).

The receive functional block 811 is configured to receive and process incoming bundles (i.e., via In 820) from other nodes of the network. The receive functional block 811 may interact with the storage functional block 812 to store received bundles and characteristics about the stored bundles, and to access characteristics about the stored bundles. Such characteristics may include those described herein such as, for example, the size of the bundle, metadata such as a file extension that associates the data of the bundle with a particular software application, a type of data of the bundle, a latency sensitivity of the bundle, a "time-to-live" of the bundle, and a type of network connection over which the bundle is to be communicated, to name just a few characteristics. Such stored characteristics may be accessed for the purpose of creating acknowledgements (ACKs) and/or other messages (e.g., a response indicating that the data of the bundle was previously received, a response indicating that the storage for bundles at the node is full, etc.), regarding the received and/or stored bundles. The receive functional block 811 may, for example, implement data retention rules that are used to determine which received bundles are to be stored in the storage functional block 812.

The routing functional block 814 is configured to generate and send messages to other nodes of the network. The routing functional block 814 may, for example, interact with neighbors of a network node (e.g., nodes within wireless communication range of the node in which the routing functional block 814 resides), to acquire and maintain updated information about the current neighbors of the node, and may interact with the storage functional block 812, to "peek" a bundle. The term "peek a bundle" may be used herein to refer to an action by a network node (e.g., a fixed or mobile AP, NC, sensor, etc.) to, for example, get access to or a copy of a bundle, or access to or a copy of the headers of a bundle (e.g., from storage), to enable the network node to determine, using the information in the bundle, when, where, and to whom to send the bundle. The routing functional block 814 may be configured to implement data dissemination rules used to determine, by way of example and not limitation, which received bundles are to be sent, which node(s) are to receive the bundles that are sent, the communication link(s) (e.g., Wi-Fi, DSRC, Bluetooth, cellular) to be used for sending the bundles, the settings to be used on the communication link(s) (e.g., the data rate, the modulation scheme, any time-out values, maximum number of retries, etc.) to be used when sending the bundles, etc. The routing functional block 814 of a node may, for example, operate to define data storage and dissemination rules related to one or more conditions in which bundles are dropped by the node, and how prioritization and scheduling of the transmission of bundles is done by the node. Such rules may, for example, provide for multiple classes of service in regards to bundle delivery delay and loss tolerance.

The storage functional block 812 is configured to maintain a data structure having records/entries for all bundles received by the node (e.g., organized in different lists, organized by a type of storage device used to store the bundle (e.g., a memory card (e.g., SD/SDHC/SDXC, CF, etc.), system FLASH memory, battery-backed RAM, and/or other forms of data storage). The storage functional block 812 may interact with the receive functional block 811 and the routing functional block 814, to provide access to, to retrieve, and/or to store data, as well as other functions that may be used to collect/generate context information.

The context information functional block 815 is configured to collect information from the neighbors of a node, from a remote server (e.g., the DTN server 720 of FIG. 7), and from the Cloud. The routing functional block 814 and the receive functional block 811 may then use the context information to configure and implement data storage and dissemination rules.

The application programming interface (API) functional block 810 of a network node is configured to parse instructions, referred to herein as "API calls," that are received by the node via the receive functional block 811. The API functional block 810 may then validate and/or authenticate the received API calls, and may then perform or cause the performance of operations requested by valid and/or authenticated API calls. Such API calls may include, for example, an API call to store data to the storage functional block 812, and an API call to fetch data from the storage functional block 812 for transmission via the routing functional block 814.

In an example implementation in accordance with various aspects of the present disclosure, control communications among network nodes (e.g., mobile APs, fixed APs, and a DTN server) may use a short "common header" for all types of messages, and may use a "type-specific header" that follows the "common header." Such type-specific headers may include, for example, what may be referred to herein as a "bundle header" (e.g., a header specifically used for messages carrying data being disseminated), what may be referred to herein as an "ACK header" for use in an acknowledgment message, and other type-specific headers for various "control messages."

The term "control message" may be used herein to refer to any type of packet used to communicate information/context between/among two or more network entities including, for example, one or more MAPs, FAPs, DTN server(s), sensor(s), and/or the Cloud. A control message may be a "request control message" that may be used, for example, to request any type of information from one or more other node(s), or a "response control message" that may be used to provide a response to a request from another node. For example, a "response control message" may be used to provide context information about status of particular bundles, about the probability of being within range of wireless communication (e.g., "contact") with a particular network node, and/or about the presence of new bundles in a network in accordance with various aspects of a network of moving things as described herein.

In a network in accordance with aspects of the present disclosure, an "ACK message", as well "response control messages" or any type of "control message" may include space for one or more "flags." Such flags may be used by a receiving node to provide additional information about the status of delivery of a control message, as well as the status of the responding neighbor, to the sending node. Examples of such status information include, but are not limited to, whether storage at the neighbor is full, whether the neighbor is experiencing any sort of technical problem(s), whether the neighbor accepts custody of the data just sent to the neighbor, whether the neighbor received and stored the data just received, whether a sufficient number of data fragments are available to enable reconstruction of the file of which the data is a part, and whether the data sent to the neighbor was already stored at the neighbor.

In an example implementation according to aspects of the present disclosure, the neighboring functional block 813 may provide context information including, for example, updates on the state of neighboring nodes. Such context information may be real-time context information, in that such information may reflect the state of a neighbor node within a short period of delay (e.g., within millisecond, tens of milliseconds, or a few hundred milliseconds of existence of the state at the neighbor node). In accordance with aspects of the present disclosure, changes in a list of neighbors maintained by any given network node (e.g., located in an operating system Kernel of the node) may be announced to the DTN. Such an announcement of changes may be sent to any network node that belongs to the DTN including, for example, neighbor nodes, neighbors of neighbor nodes, and a DTN server. In accordance with aspects of the present disclosure, the neighboring functional block 813 of any network node may pre-filter the list of neighbors that the node maintains. The pre-filtering may be performed before the list of neighbors of the node is announced to the DTN. Such pre-filtering may, for example, be based on context information maintained by the node including, by way of example and not limitation, RSSI measurements of wireless signal(s) from the neighbor node(s), an average time between reboots of the neighbor node(s), an indication of one or more technical (e.g., electrical, software, etc.) problem(s) at the neighbor node(s), and/or other information that is a factor in assessing the reliability or stability of the neighbor node(s). Such pre-filtering may produce a list of the "best" or "healthiest" neighbors, which may identify those neighbors that may be relied upon to operate predictably and reliably. In this manner, the routing functional block 814 of a node may then use the filtered list of neighbor nodes in configuring and implementing data storage/retention and dissemination rules. In accordance with various aspects of the present disclosure, one or more thresholds for one or more parameter values used in the pre-filtering process (e.g., a minimum RSSI for a node to be considered as providing a usable wireless communication link) may be adjusted dynamically, based on a variety of factors including, for example, feedback from previous communication with neighbor nodes, the size of a particular bundle to be transmitted to a neighbor node, and/or the like.

In accordance with aspects of the present disclosure, data storage/retention and dissemination rules for downstream data may determine, by way of example and not limitation, whether a bundle is sent as unicast, multicast, or broadcast traffic; whether a recipient of the bundle is to send an ACK; and/or whether an end-to-end ACK for a bundle is to be sent to and/or from a DTN server (e.g., DTN server 720). Such data storage/retention and dissemination rules for downstream data may also determine, for example, how many replicas/copies of a particular bundle should be sent by a particular sender or a particular type of sender (e.g., the sender originating the bundle and communicating the bundle to an intermediate node, an intermediate node communicating the bundle to another intermediate node, a sender communicating the bundle to a DTN server, and/or other types). Data storage/retention and dissemination rules for downstream data of a network, in accordance with aspects of the present disclosure, may determine, by way of example and not limitation, whether to use fixed access points as anchors (i.e., whether a mobile AP should only send or receive a bundle that originated at a fixed AP, when in range of a fixed AP). Such data storage/retention and dissemination rules for downstream data may also determine, by way of example and not limitation, whether to request control information from fixed APs and/or the Cloud, to help the download of a particular file (e.g., information about how many more fragments are needed to be able to decode the particular file, how many fragments of a particular file have been received so far, and/or the like); and/or whether a device, or a bundle is currently on, or should be added to, a "blacklist." The term "device" may be used in this context to refer to, for example, a network node (e.g., a fixed or mobile AP, NC), an end-user device (e.g., a cellphone; smart phone; tablet, laptop, or other type of computer), or a sensor, if such a device is part of a DTN. In accordance with aspects of the present disclosure, a device or node that has been "blacklisted" may not be used to send bundles, and may be avoided by other network nodes, etc., since the device or node may be "blacklisted" for many reasons including, for example, poor network performance, full/limited storage capacity, and/or security issues, to name only a few reasons.

Figure 9:
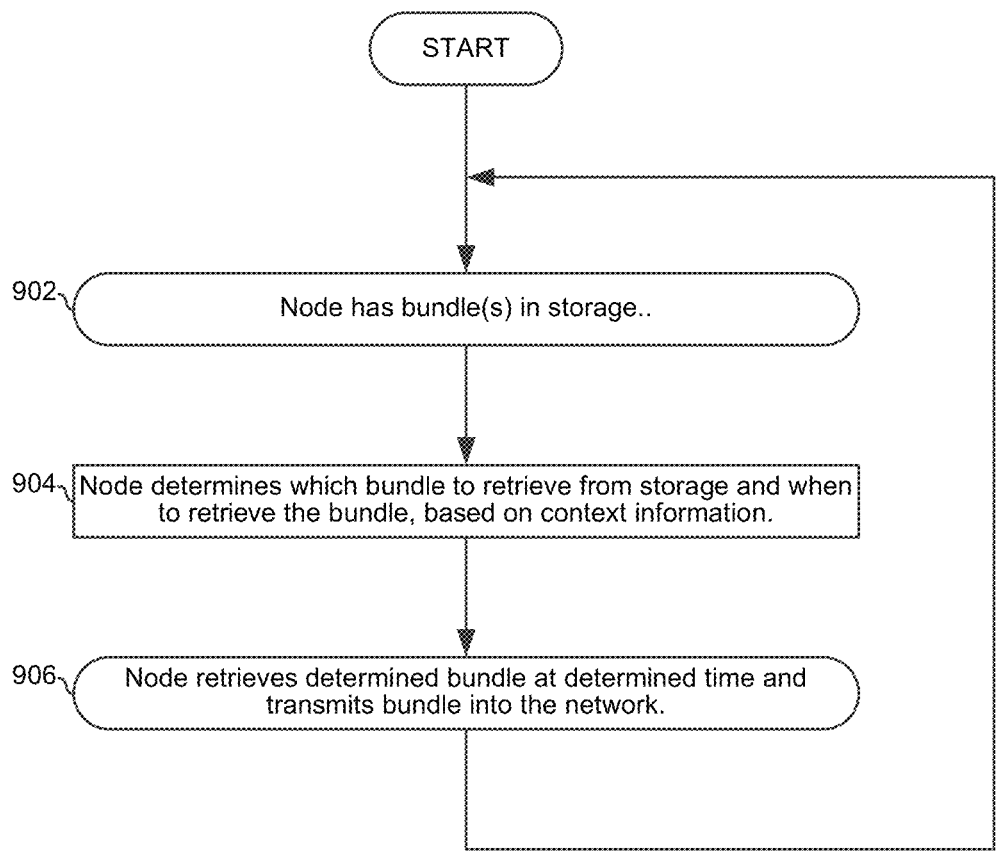
FIG. 9 is a high-level flowchart illustrating an example process for retrieving a bundle of data from storage of a network node and transmitting the bundle of data into the network, in accordance with various aspects of the present disclosure.

FIG. 9 is a high-level flowchart illustrating an example process for retrieving a bundle of data from storage of a network node and transmitting the bundle of data into the network, in accordance with various aspects of the present disclosure. At block 902, a network node such as, for example, a mobile AP or a fixed AP, may have one or more bundles of data in the storage of the network node (e.g., in solid state memory such as battery-backed RAM, "flash" memory or solid state drive (SSD), and/or mechanical memory such as a hard disk drive (HDD)). Then, at block 904, the network node may determine, based on various context information and applicable data storage and dissemination rules, which, if any, bundles of data to retrieve from storage for transmission, and when to retrieve the bundle(s). Context information that may include, for example, bundle context information such as, for example, a "time-to-live" of the stored bundle(s) (i.e., the date/time at which the stored bundle(s) expire), whether the bundle(s) is/are destined "upstream" (e.g., towards a centralized server (e.g., DTN server 720 of FIG. 7) or Cloud-based system) or "downstream" (e.g., away from a centralized server or Cloud-based system), the respective size(s) of the stored bundle(s), the device(s) and/or software application(s) which generated the bundle(s), any quality of service (QoS) requirements of the software applications or services to which the bundle(s) are destined, the age of the bundle, and/or the like. At block 906, the network node retrieves the determined bundle(s) at the determined time(s), and transmits the retrieved bundle(s) into the network and towards the destination based upon the context information.

In accordance with various aspects of the present disclosure, block 904 of FIG. 9 may comprise, for example, determining which bundles of data stored in memory of a network node to read and transmit toward a respective bundle destination, based on a "time-to-live" context parameter associated with the bundle. The "time-to-live" context parameter was previously described above. For example, a stored bundle that will expire first may be sent toward the bundle destination first, in order to reduce or avoid altogether a situation in which a bundle stored on a network node expires (and is dropped or archived) while waiting to be transmitted towards the bundle destination. As discussed above, the bundle may be transmitted wirelessly using any of a number of possible wireless specifications and/or protocols. A possible consequence of this approach is that later-expiring bundles may end up expiring or getting dropped by a network node before they get a chance to be transmitted toward their respective destination(s). This situation may be mitigated, however, by using the "time-to-live" context information parameter in combination with other context information, such as the various context information parameters/items described herein. For example, in accordance with some aspects of the present disclosure, bundles of data having different assigned QoS priority levels may be stored in different queues in the storage within a network node, and the "time-to-live" associated with each queued bundle may then be used to determine the order of transmission of bundles having the same QoS priority. In accordance with various aspects of the present disclosure, one or more parameters/items of context information may be used concurrently for determining the priority of transmission of bundles of data stored in various queues of a network node.

In accordance with various aspects of the present disclosure, block 904 of FIG. 9 may comprise determining which of one or more bundle(s) of data held in storage of a network node to read or retrieve for transmission toward their respective destinations in the network, based upon a priority level that may be assigned to the one or more bundle(s) and/or to one or more software application(s)/service(s) with which the one or more bundle(s) is/are associated. There may be a certain finite number of priority levels, and each bundle of data may be marked with/assigned a particular priority level when the bundle of data is created and/or when the bundle of data enters a network as described herein such as, for example, at a central computer system or Cloud-based system (e.g., a DTN server such as DTN server 720), at a fixed AP, or at a mobile AP. In accordance with aspects of the present disclosure, a highest priority level may be reserved for bundle(s)/traffic that need(s) to be communicated in real-time or near-real time (e.g., used in transporting vehicle collision avoidance and/or other safety data).

In accordance with various aspects of the present disclosure, nodes of a network as described herein may employ different physical and/or logical queues for bundles that are assigned different priority levels. For example, an explicit priority level indicator for a particular bundle may be inserted into the particular bundle (or into one or more packets used to carry the bundle—such as in one or more bits of a bundle or packet header field, for example). For example, a computer system such as a DTN server (e.g., DTN server 720 of FIG. 7) may inspect a "downstream" bundle to determine an appropriate priority level for the bundle (e.g., based on source address, source port, source application/service, destination address, destination port, destination application/service, and/or the like of the bundle or of a packet of the bundle), and may then insert a corresponding priority level indicator into the bundle or packet(s) of the bundle prior to transmitting the bundle to, for example, one or more fixed APs of the network. In a corresponding fashion, a software application/service (e.g., running in a mobile AP, a fixed AP, or a client/end-user device) that generates one or more "upstream" and/or "downstream" bundle(s) may insert an appropriate priority level indicator into the one or more bundle(s) prior to transmitting the one or more bundle(s) to a fixed AP, a mobile AP, or a centralized/shared computer system and/or Cloud-based system (e.g., a DTN server). In accordance with some aspects of the present disclosure, no explicit priority level indicator that is inserted into/associated with a bundle may be used. In an alternate example according to aspects of this disclosure, each node of a network may, for example, perform inspection (also referred to herein as "peeking") of one or more bundle(s) (or of the one or more packet(s) that carry the data of the one or more bundle(s)), to determine an appropriate priority level based on, for example, contents and/or information elements of one or more packets of a bundle, context information related to a neighbor node that is the source/destination of a bundle, context information related to a communication link/connection used to communicate the bundle, and/or some other basis.

In accordance with various aspects of the present disclosure, block 904 of FIG. 9 may comprise determining which, if any, of one or more bundle(s) of data stored in memory of a network node are to be read or retrieved and transmitted by the network node (e.g., a mobile AP and/or fixed AP) using certain communication technologies (e.g., commercial pay-for-use cellular telephone/data networks), only under certain conditions that may be defined by dissemination rules for the direction of transport (e.g., "downstream" and/or "upstream"). Such conditions may include, for example, the determination that there is a certain likelihood (e.g., greater than some determined threshold probability) that, if the sending network node continues to rely solely on other, possibly lower cost, alternative communication technologies such as, for example, wireless communication connections via Wi-Fi (e.g., IEEE 802.11a/b/g/n/ac/ad) and/or IEEE 802.11p Dedicated Short Range Communication (DSRC) connections), the "time-to-live" of the one or more bundle(s) will expire before the one or more bundle(s) reach their intended destination.

In accordance with aspects of the present disclosure, block 904 of FIG. 9 may comprise determining whether different priority levels are to be assigned to different bundles read or retrieved from storage of a network node, based on whether the bundles are heading "upstream" or "downstream" in the network of the present disclosure For example, there may be times when a particular network node has in storage a relatively large number of bundles that are destined for network nodes that are "downstream" from the particular network node and may have few or no bundles destined for network nodes that are "upstream" of the particular network node. In such a situation, the particular network node may assign a relatively higher priority to bundles destined for network nodes that are "downstream" of the particular network node, to aid in clearing those bundles from storage of the particular network node (e.g., to avoid having a "time-to-live" of those bundles expire). The particular network node may thus give preference to transmission of the relatively higher-priority bundles destined for network nodes that are "downstream," and may reduce the likelihood of transmission, or not transmit bundles that destined for network nodes that are "upstream" of the particular network node. In a similar manner, there may be times when a particular network node has in storage few or no bundles that are destined for network nodes that are "downstream" from the particular network node and may have numerous bundles that are destined for network nodes that are "upstream" of the particular network node. In this situation, the particular network node may assign a relatively higher priority to bundles that are destined for network nodes that are "upstream," and may therefore give preference or priority to the transmission of bundles destined for network nodes that are "upstream" of the particular network node, over bundles that are destined "downstream." Such an assignment of priority based on direction of the bundles (i.e., "upstream" or "downstream") may be a temporary assignment based on a number of bundles in storage or an amount of unused storage capacity that is less than a certain threshold amount of the storage of a network node. In this manner, a priority may be assigned by a particular network node to each bundle being handled according to whether the bundle is destined for a network node that is "upstream" or "downstream," depending on one or more items/parameters of the current context of the particular node.

In accordance with aspects of the present disclosure, block 904 of FIG. 9 may comprise a first network node such as, for example, a mobile AP, determining upon connecting to a second network node such as, for example, a fixed AP, whether to first read or retrieve and transmit bundles destined "upstream" to the second network node, or to instead first request "downstream" destined bundles of data from the second network node (e.g., the fixed AP), based upon the priority of bundles destined "upstream" versus the priority of bundles destined "downstream" Because of the relative motion of mobile APs and fixed APs, wireless communication opportunities between mobile APs and fixed APs may be relatively short lived (e.g., a few hundreds of milliseconds to ten seconds or so), the network node having one or more bundles of data of a relatively higher priority destined for an "upstream" network node or a "downstream" network node may read/retrieve and communicate such bundles first, to ensure that at least some of the higher-priority traffic gets communicated between the fixed AP and mobile AP. That is, to make the best use of the brief opportunities for wireless communication that may occur between network nodes in relative motion, e.g. a mobile AP and a fixed AP, or between two mobile APs, network nodes in accordance with the present disclosure may use context information and dissemination rules that may be dynamically adjusted to control the priority of transmission of "upstream" and "downstream" bundles of data.

In accordance with various aspects of the present disclosure, block 904 of FIG. 9 may comprise determining which bundles stored in a particular network node are bundles that originated in the particular network node (i.e., bundles that were created/generated by the particular network node itself), as opposed to bundle(s) that were created by another network node and received by the particular network node, to enable the particular network node to assign a relatively higher priority for transmission to those bundles that originated in the particular node. In accordance with aspects of the present disclosure, each network node as described herein may track and/or monitor such bundles that originated within the network node, as opposed to those that were received by the network node. Additionally, or alternatively, a particular network node may track which of the bundles in the storage of the particular network node are to be generally disseminated to nodes throughout the network, and which bundles are to be delivered to a specific destination network node. Data dissemination and storage rules used by a particular network node may then, for example, dictate whether to do a fair round-robin selection in which each type of bundle (i.e., those bundles that originated within the particular network node, and those bundles that originated at another network node) gets equal opportunity for transmission by the particular network node, or to give one or more of the bundle types a greater number of transmit opportunities than other bundle types. For example, in an example involving a mobile AP, which bundles of data at the mobile AP are given priority over other bundles of data at the mobile AP may depend on whether the mobile AP is currently within wireless communication range or wirelessly communicating with or to a fixed AP. For example, in accordance with aspects of the present disclosure, a mobile AP that is in wireless communication with a fixed AP may have bundles of data that are in transit to a specific network destination (e.g., a server such as DTN server 720 or other Cloud-based system) via a route that must pass through a fixed AP. Those bundles may, for example, be assigned a relatively higher priority for transmission by the mobile AP over a priority of other bundles destined for network nodes that are reachable without passing through the fixed AP, in order to exploit the connection with the fixed AP and offload such bundles as soon and as quickly as possible. However, when the mobile AP is not in wireless communication with a fixed AP and is in wireless communication with one or more neighboring mobile APs, the mobile AP may use that time to transmit any stored bundles of data that are to be generally disseminated (i.e., not involving a fixed AP, such as for other mobile APs), and such bundles may be prioritized for transmission by the mobile AP in such situations.

In accordance with various aspects of the present disclosure, block 904 of FIG. 9 may comprise determining which of a number of different data storage and dissemination rules may apply to bundles of data stored in different types of network node data storage and to be read or retrieved for transmission. For example, different data storage and dissemination rules may apply based on various characteristics of the storage device(s) in use at the various nodes of the network. Such characteristics may include, for example, whether a storage device of a node is "volatile" (i.e., the storage device loses any stored data when electrical power to the storage device is interrupted) or "nonvolatile" (i.e., the storage device employs a storage technology that retains any stored data when electrical power is interrupted); whether a storage device is solid state (e.g., semiconductor memory such as flash memory or an SSD) or mechanical (e.g., a HDD); an amount of the total capacity of a storage device; an amount of the unused capacity (i.e., "free space") of a storage device; an amount of time representing the access time/speed (e.g., latency and read/write speed) of a storage device; a "mean time to failure" (MTTF) of a storage device; and/or the like. In accordance with various aspects of the present disclosure, one or more bundles of data stored in a volatile storage device of a particular network node may be assigned a relatively higher priority for transmission to, for example, a centralized/shared computer system (e.g., DTN server 720) or Cloud-based system, over a priority assigned to other bundles that are stored in a nonvolatile storage device of the particular network node.

In accordance with aspects of this disclosure, the actions of block 904 of FIG. 9 may comprise determining which bundles in storage of a network node to read or retrieve based on a priority assigned to each of one or more bundles stored in a same type of data storage at different network nodes. Such a priority may be dynamically adjusted based on the operating conditions at the respective network nodes. For example, one or more bundles of data stored in volatile semiconductor memory located in a network node installed in an autonomous or user-driven electric vehicle may be assigned a higher priority for transmission than bundles of data stored in semiconductor memory located in a network node installed in a diesel powered bus, or in a fixed AP that is power by a commercial/municipal power grid. This may be so because, for example, the likelihood of loss of electrical power in an battery-powered vehicle may be greater than the likelihood of loss of electrical power in a self-powered vehicle operating on combustible fuels or the likelihood of loss of electrical power of a network node serviced by municipal/commercial power sources. Such adjustment/modification of bundle priority may, for example, be in effect until all affected bundles of data have been transmitted by the network node and/or have been safely committed to nonvolatile memory.

In accordance with various aspects of the present disclosure, block 904 of FIG. 9 may comprise determining which bundles of data available for retrieval and transmission reside in storage that has relatively faster access times (e.g., a SSD or battery-backed semiconductor random access memory (RAM)) and therefore may, for example, be given priority over reading/retrieval and transmission of bundles of data residing in storage having relatively slower access times (e.g., a mechanical HDD). For example, bundles of data stored in a SSD of a mobile AP may be quickly accessed and transmitted to a fixed AP during what may be the brief period(s) of time when the mobile AP is within wireless communication range of a fixed AP (e.g., when the mobile AP passes the fixed physical location of the fixed AP). In accordance with aspects of the present disclosure, bundles of data stored in a HDD of such a mobile AP may then be moved to the SSD of the mobile AP (e.g., when the mobile AP is no longer within wireless communication range of the fixed AP), in anticipation of the next opportunity that the mobile AP may have to establish a wireless link with a fixed AP.

In accordance with various aspects of the present disclosure, a network node having a storage device that has a relatively high likelihood of failure (e.g., nearing its MTTF, or exhibiting signs of failure such, for example, an increasing number of read errors) may decide to replicate fewer bundles, and thus impose fewer reads/writes upon the failing storage device, in comparison to another network node that has a newer and/or more resilient/robust/reliable storage device.

In accordance with various aspects of the present disclosure, a data rate used for transmission may be assigned on a per-node and/or per-traffic-type basis. The data rate may be measured or specified using various units (e.g., bits per second (bps)), and the traffic may be of different types, although all types of traffic may be transported in the form of bundles of data as discussed herein. The data rate used may be adapted/adjusted based on, for example, information representative of signal quality measurements (e.g., a received signal strength indicator (RSSI), a signal to noise ratio measurement (SNR), a bit error rate (BER)) of wireless communication to/from neighbor nodes, rate(s) of successful communication with other network nodes (e.g., based on acknowledgements (ACKs) received from message destination nodes, e.g., a ratio of the number of acknowledgements or negative acknowledgements received for a certain number of messages sent to neighboring nodes), and/or the like. For example, if RSSI measurements of signals from one or more neighbor node(s) of a mobile AP are relatively lower than others or are below a minimum threshold value, and/or if the mobile AP is not receiving acknowledgements from the neighbor node(s) in response to transmissions to those neighbor node(s), then the mobile AP may choose to reduce its wireless communication data rate until the RSSI improves or until a new neighbor is discovered. The data rate in use may be adapted or adjusted based on the density of mobile APs in the area (e.g., in areas with higher density of mobile APs, a lower data rate may be used to allow more mobile APs to communicate at least something). In an example implementation, the data rate may be reduced when there are a low number of bundles with low priority and which do not expire before some threshold. In this manner, more bandwidth can be allocated for higher priority traffic. For example, by reducing the amount of data transmitted into the network by a network element such as a server or Cloud-based system (e.g., DTN server 720), more of the wireless network capacity is available for other users of the wireless network such as, for example, traffic to or from end-users via Wi-Fi (e.g., IEEE 802.11a/b/g/n/ac/ad).

In accordance with various aspects of the present disclosure, the interval of time at which a network node attempts one or more retransmission(s) of a bundle of data may be adaptive. The retransmission interval may be adapted/adjusted based on, for example, indication(s) of the RSSI of wireless transmissions to/from neighbor node(s), success rate(s) of previous node transmissions to neighbor nodes (e.g., based on received ACKs), and/or various characteristics of the bundle(s) being communicated (e.g., a priority level assigned to each bundle/each packet of each bundle, and a "time-to-live" of each bundle, and/or the like). The retransmission interval for a bundle of data may also be adapted/adjusted based on whether the bundle was generated by the transmitting node or is a bundle received from another node, and/or whether the bundle is destined "upstream" or "downstream." For example, data dissemination and storage rules may dictate that a particular network node attempt to retransmit a bundle relatively more quickly if the bundle originated in the particular network node, but may wait relatively longer if the bundle was received from another network node.

In accordance with aspects of the present disclosure, the data rate used for transmission of a message (e.g., a bundle of data or a control message) may be adapted/adjusted based on whether the message is a first transmission attempt, or a retransmission of a previous message transmission attempt. For example, where a failed transmission of an important message (e.g., a data bundle or a control message) used a lower data rate, the retransmission may use a higher data rate. By increasing the data rate of the retransmission of the message from that used for the original transmission, the likelihood of successfully completing the retransmission during the remainder of the window of opportunity during which the sending and receiving nodes are within wireless communication range, may be improved.

Figure 10A:
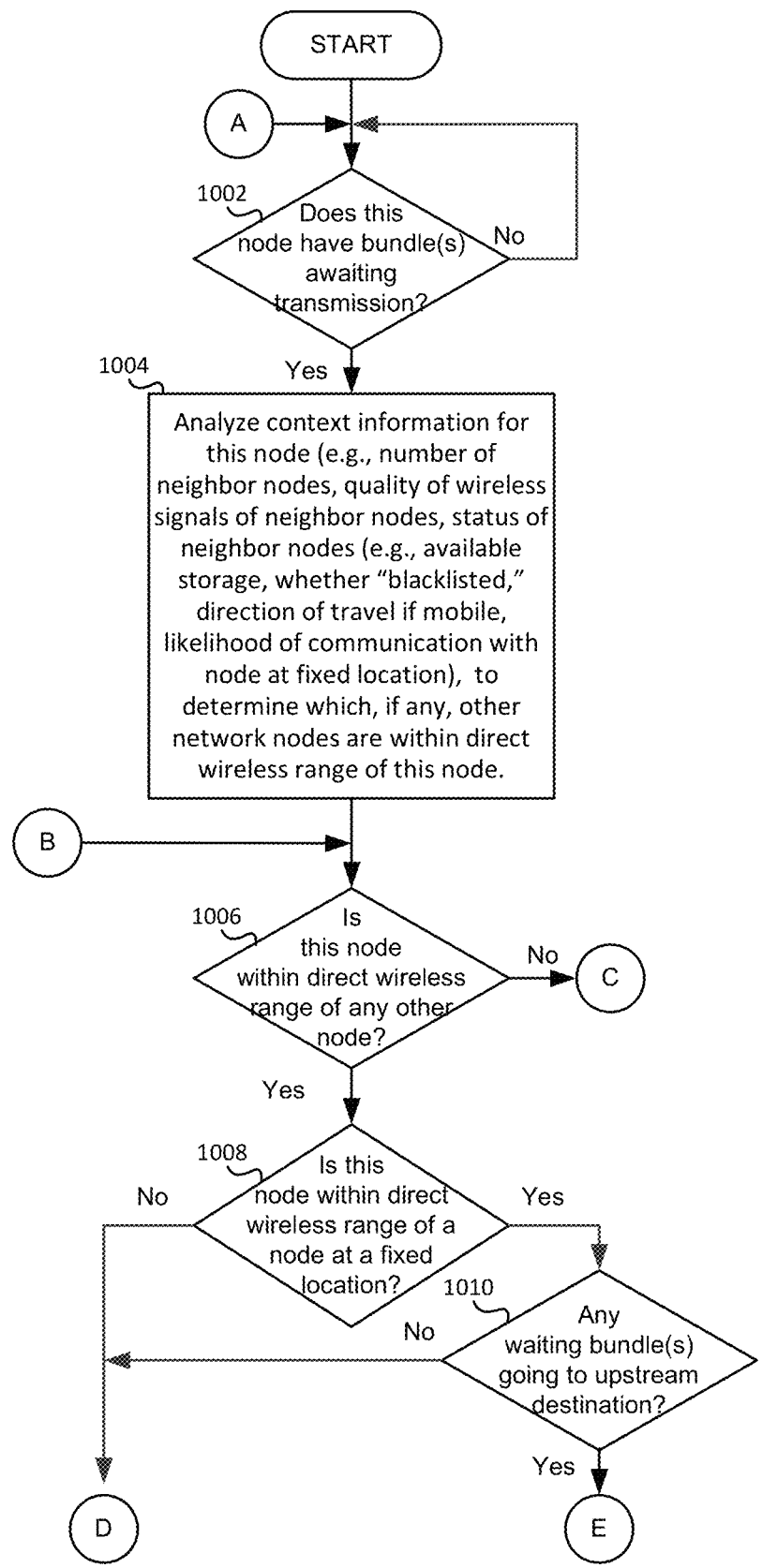
FIGS. 10A-10C are a flowchart illustrating an example process for managing the scheduling and prioritizing of data in a network of moving things, in accordance with various aspects of the present disclosure.
Figure 10B:
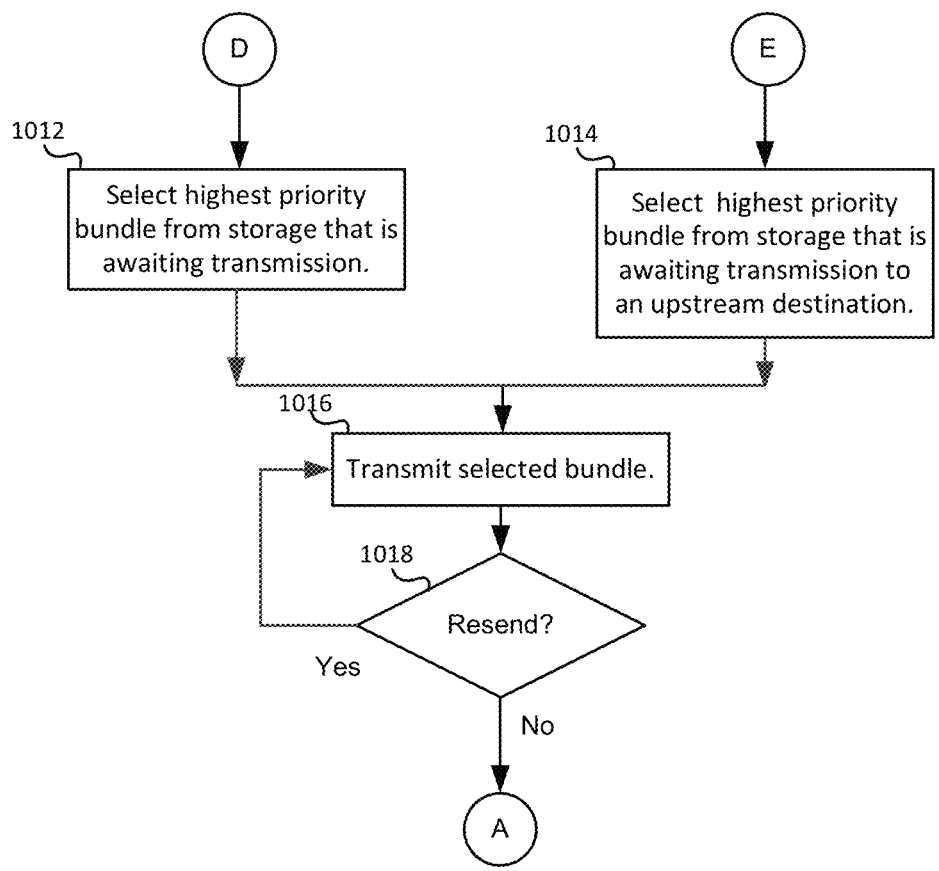
Figure 10C:
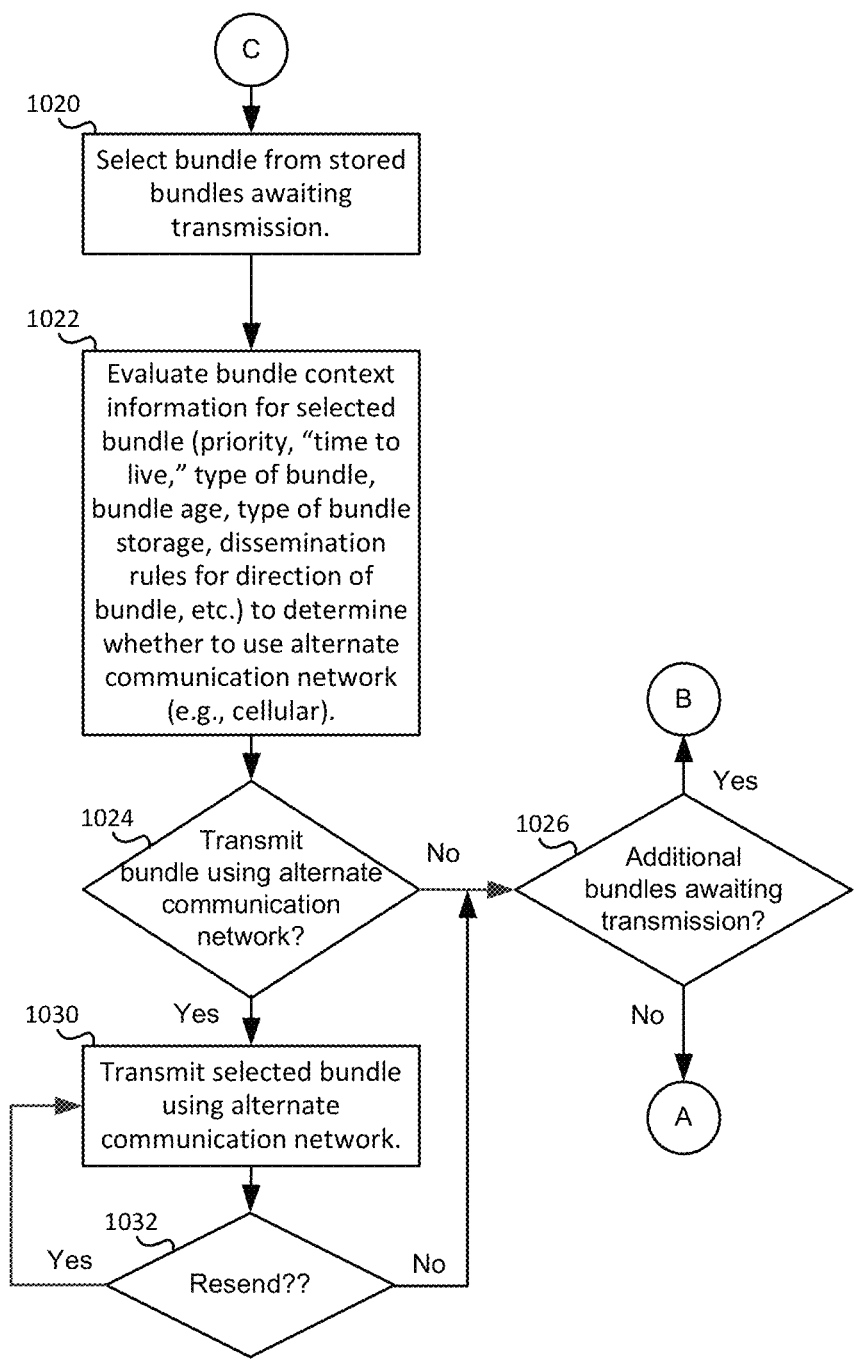

FIGS. 10A-10C are a flowchart illustrating an example process for managing the scheduling and prioritizing of data in a network of moving things, in accordance with various aspects of the present disclosure. FIGS. 10A-10C show additional details of some of the actions of the flowchart 900 illustrated in FIG. 9 and previously described above. The method of FIGS. 10A-10C may be performed by, for example, a node (e.g., a fixed AP or mobile AP) of a network as illustrated and described above in regards to FIGS. 1-9. The following discussion makes frequent reference to the use of various types of "context information." Additional details about the nature of such "context information" are described below, and have been previously described above.

The method of FIGS. 10A-10C may, for example, be initiated at the startup of a suitable element of the network (e.g., as a process/thread started on a network node such as a fixed AP, a mobile AP), when an underlying operating system begins running), and may run on a continuing basis, once started. The actions of the method begin at block 1002, where a determination is made as to whether a network node such as, for example, a fixed AP or mobile AP on which the actions of the method are being performed, has one or more bundles of data awaiting transmission to a corresponding destination. The bundles of data may be stored in various types of memory of the network node as discussed above, and may be organized into one or more storage structures (e.g., queues) based on a priority assigned to each bundle of data or the portions of a file contained in the bundle of data. If it is determined, at block 1002, that the network node has no bundles of data awaiting transmission, the method of FIG. 10A-10C simply loops back to check again. In accordance with aspects of the present disclosure, such a loop may be non-blocking, running within a process or thread, and may permit other actions of other methods running on the network node to continue to operate normally. If, however, at block 1002, it is determined that the network node does have at least one bundle of data awaiting transmission, then the method continues at block 1004, the method may analyze context information for this network node including, for example, how many neighbor nodes this network node has; the quality of wireless signals received by this network node from each neighbor node(s); the status of each neighbor node(s) (e.g., an amount of available storage at each neighbor node, and the operational status of each neighbor node (e.g., operating normally, experiencing error conditions and/or malfunctions). Such context information may also include, for example, whether this node is "blacklisted;" a direction of travel of this node (e.g., compass direction (e.g., N, E, W, S), heading in degrees (e.g., zero degrees being North)); whether this network node is mobile (e.g., a mobile AP); and a likelihood of communication of this network node with another network node that is at a fixed location (i.e., a fixed AP)), to name just a few possible items of context information. The analysis may also determine, among other things, whether this network node is within direct wireless communication range of any other nodes of the network using a low- or no-cost radio frequency (RF) wireless network such as, for example, Wi-Fi (e.g., IEEE 802.11a/b/g/n/ac/ad), Bluetooth® (or other short-range, wireless, communication protocol standard), and/or DSRC (IEEE 802.11p).

Next, at block 1006, if the analysis of the context information performed at block 1004 has determined that this network node is not within direct wireless communication range of another network node, the method continues at block 1020 of FIG. 10C, discussed below. If, however, the analysis of block 1004 determines that this network node is not within direct wireless communication range of another network node then, at block 1006, the flow of the method continues at block 1008, where it is determined whether this network node is within direct wireless communication range of a network node located at a fixed location (e.g., a fixed AP). If, at block 1008, it is determined that this network node is not within direct wireless communication range of a network node at a fixed location, the method continues at block 1012, which is discussed below. If, however, it is determined at block 10087 that this network node is within direct wireless communication range of a network node at a fixed location, the method continues at block 1010. At block 1010, the network node performing the method of FIG. 10A may determine whether any bundles of data waiting to be sent "upstream" are present in the storage of this network node. If, at block 1010, it is determined that no bundles of data destined "upstream" are waiting to be sent by this network node, the method of FIG. 10A continues at block 1012 of FIG. 10B, which is discussed below. If, however, it is determined that one or more bundles of data destined "upstream" are, in fact, waiting to be sent by this network node, the method of FIG. 10A continues at block 1014 of FIG. 10B, discussed below.

At block 1012 of FIG. 10B, the network node performing the method may select the highest priority bundle of data awaiting transmission, from the storage of the network node. Next, at block 1016, the actions of the method may wirelessly transmit the selected bundle of data, and at block 1018, a check may be made to determine whether the network node should loop back to block 1016, to resend the selected bundle of data such as, for example, when the network node performing the present method determines that an acknowledgement from the destination of the transmission of the selected bundle of data was not received within a certain time limit, or was not received correctly. If, at block 1018, it is determined that no retransmission of the selected bundle of data is needed, the method of FIG. 10B may then return to block 1002 of FIG. 10A, discussed above.

At block 1014 of FIG. 10B, the network node performing the method may select, from the storage of the network node, the highest priority bundle of data awaiting transmission to an "upstream" destination. In this manner, the network node performing the present method may provide priority to the offloading or forwarding of bundles of data destined for a shared server (e.g., the DTN server 720) or Cloud-based system. Then, at block 1016, the node performing the method may wirelessly transmit the selected bundle of data to the "upstream" destination of the bundle of data and, at block 1018, determine whether the method should loop back to block 1016, to resend the selected bundle of data such as, for example, when the network node performing the present method determines that an acknowledgement from the destination of the transmission of the selected bundle of data was not received within a certain time limit, or was not received correctly. If, at block 1018, it is determined that no retransmission of the selected bundle of data is needed, the method of FIG. 10B may then return to block 1002 of FIG. 10A, discussed above.

Turning now to block 1020 of FIG. 10C, the method of FIGS. 10A-10C may select a bundle of data from the bundles of data in storage that are awaiting transmission. In the context of block 1020, the network node performing the method does not currently have available, direct wireless communication with any other nodes of the network. In this situation, the network node performing the present method may, at block 1022, evaluate context information for the selected bundle including, for example, priority information, a "time to live," a bundle type, a bundle age, a type of storage in which the selected bundle is stored, and/or dissemination rules for direction of the selected bundle, among other context items. Using such context information, the network node may determine whether to use an alternative wireless communication network other than a low- or no-cost radio frequency (RF) wireless network such as, by way of example and not limitation, Wi-Fi (e.g., IEEE 802.11a/b/g/n/ac/ad), Bluetooth® (or other short-range, wireless, communication protocol standard), and/or DSRC (IEEE 802.11p), such as, for example, a commercial cellular wireless network or other, perhaps wide-area RF communication network. In accordance with various aspects of the present disclosure, the present network node may be equipped to communicate using such an alternate wireless communication network under certain conditions that may be defined by, for example, data storage and dissemination rules and/or other configuration information provided to the present network node by a centralized and/or shared system that may, for example, be Cloud-based. Additional information about such a system may be found, for example, in U.S. patent application Ser. No. 15/138,370, titled "Systems and Methods for Remote Configuration Update and Distribution in a Network of Moving Things," filed on Apr. 26, 2016, the contents of which is hereby incorporated herein by reference, in its entirety.

Next, at block 1024, the method of FIG. 10C may make a determination of whether to wirelessly transmit the selected bundle of information using the alternate wireless communication network. This choice may be made when, for example, the selected bundle of data is assigned a relatively high priority such as for bundles of data related to emergency services and first responders (e.g., medical, fire, law enforcement), or when the bundle is nearing the end of the "time-to-live" of the bundle. If, at block 1024, it is determined that an alternate wireless communication network should not be used to transmit the selected bundle then the method of FIG. 10C may continue at block 1026, described below. If, however, at block 1024, it is determined that an alternate wireless communication network should be used to transmit the selected bundle, the method may then proceed to block 1030, where the selected bundle may be transmitted towards the bundle destination, using an alternate wireless communication network. A check may then be made, at block 1032, to determine whether the method should loop back to block 1030, to resend the selected bundle of data such as, for example, when the network node performing the present method determines that an acknowledgement from the destination of the transmission of the selected bundle of data was not received within a certain time limit, or was not received correctly. If, at block 1032, it is determined that no retransmission of the selected bundle of data is needed, the method of FIG. 10C may then continue at block 1026, discussed below.

At block 1026 of FIG. 10C, the method may determine whether additional bundles of data are in storage of the network node, awaiting transmission towards their respective destinations. If no additional bundles of data are available, the method of FIGS. 10A-10C may return to block 1002, described above. If, however, the present network node has additional bundles of data awaiting transmission, the method continues at block 1006, discussed above.

Various aspects of the present disclosure may be found in a method of managing scheduling and prioritizing of data by nodes of a wireless network comprising a plurality of nodes and a Cloud-based system. Each node of the plurality of nodes may comprise storage for one or more bundles of data, and at least one radio frequency interface for communicating wirelessly using a first wireless communication protocol and a second wireless communication protocol. Such a method may comprise ascertaining, by a first node of the plurality of nodes, whether one or more bundles of data for transmission by the first node are present in the storage of the first node, wherein each of the bundles of data may comprise one or more packets of data and bundle context information that may comprise a bundle priority and a bundle destination. The method may comprise creating, by the first node, wireless network context information for the first node using the at least one radio frequency interface, where the wireless network context information may comprise information identifying each node of the plurality of nodes that is a neighbor node in direct wireless communication range of the first node using the first wireless communication protocol, a respective indication of quality of a wireless signal received from the neighbor node, and a respective type of the neighbor node. The method may further comprise determining, by the first node, whether there are currently one or more neighbor nodes of the first node, and transmitting a first bundle of data from the storage of the first node to the bundle destination via a neighbor node using the first wireless communication protocol, if there are one or more neighbor nodes of the first node and one or more bundles of data are present in storage of the first node. The method may also comprise transmitting a second bundle of data from the storage of the first node to the bundle destination using the second wireless communication protocol, if there are no neighbor nodes of the first node. The method may comprise repeating the ascertaining and creating, if no bundles of data are available in the storage of the first node.

In accordance with various aspects of the present disclosure, the first bundle of data may be selected according to bundle priority and respective type of node of the one or more neighbor nodes, and the second bundle of data may be selected according to the bundle priority. The bundle context information may comprise any one of an age in the network of each of the one or more bundles of data, an amount of time to live of each of the one or more bundles of data, and a total number of copies of each specific bundle of the one or more bundles of data currently residing within storage of the plurality of nodes of the network. The wireless network context information may comprise a number of the neighbor nodes. Transmitting the bundle of data from the storage of the first node to the bundle destination via a neighbor node using the first wireless communication protocol may take into account a set of data dissemination rules for a direction of communication of bundles in the network, and the data dissemination rules may be received by the first node from the Cloud-based system. The set of data dissemination rules may be selected from two or more sets of data dissemination rules that may comprise a first set of data dissemination rules for a downstream direction of transfer of bundles of data through the network and a second set of data dissemination rules for an upstream direction of transfer of bundles of data through the network. The upstream direction may be towards the Cloud-based system and the downstream direction may be away from the Cloud-based system.

In accordance with various aspects of the present disclosure, the type of neighbor node may comprise one of at least two types of nodes that may comprise a node of a first type that is located at a fixed geographic location, and a node of a second type that is part of a vehicle that acts as a mobile access point configured to wirelessly communicate via the network, data of end-user devices accessing the network via the mobile access point. Transmitting the first bundle of data to the bundle destination may comprise determining that a number of available wireless communication links at the first node is two or more, based on the wireless network context information indicative of quality of a wireless signal received from the neighbor node. In addition, transmitting the first bundle of data from the first node to the destination may comprise routing a copy of the first bundle of data through two or more neighbor nodes to the destination of the first bundle.

Various aspects of the present disclosure may be observed in a non-transitory computer-readable medium having a plurality of code sections, where each code section may store a plurality of instructions executable by one or more processors to cause the one or more processors to perform a method of managing scheduling and prioritizing of data by nodes of a wireless network comprising a plurality of nodes and a Cloud-based system. Each node of the plurality of nodes may comprise storage for one or more bundles of data, and at least one radio frequency interface for communicating wirelessly using a first wireless communication protocol and a second wireless communication protocol. The steps of such a method may be as described above.

Further aspects of the present disclosure may be seen in a system for managing scheduling and prioritizing of data by a node of a wireless network comprising a plurality of nodes and a Cloud-based system. Such a system may comprise one or more processors operatively coupled to storage for one or more bundles of data, and at least one radio frequency interface for communicating wirelessly using a first wireless communication protocol and a second wireless communication protocol. The one or more processors may operable to, at least, perform the steps of a method such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method of managing scheduling and prioritizing of data by nodes of a wireless network comprising a plurality of nodes and a Cloud-based system, the method comprising:
   analyzing wireless network context information for a first node of the plurality of nodes, wherein the wireless network context information comprises information identifying each node of the plurality of nodes that is a neighbor node in direct wireless communication range of the first node using a first wireless communication protocol, a respective indication of quality of a wireless signal received from the neighbor node, and a respective type of the neighbor node;
   determining, based on analysis of the wireless network context information, whether there are currently one or more neighbor nodes of the plurality of nodes that are within direct wireless communication range of the first node for the first wireless communication protocol;
   when the first node is within direct wireless communication range of at least one neighbor node:
      selecting a first bundle of data;
      transmitting, by the first node, the first bundle of data to the at least one neighbor node using the first wireless communication protocol; and
   when the first node is not within direct wireless communication range of another node of the plurality of nodes:
      selecting a second bundle of data;
      examining bundle context information for the second bundle of data, wherein the bundle context information comprises at least a bundle priority and a bundle destination;
      determining based on examining one or more conditions for using an alternate communication network in transmitting the second bundle of data; and
      when at least one condition is met, transmitting, by the first node, the second bundle of data to the bundle destination using a second wireless communication protocol associated with the alternate communication network.

2. The method according to claim 1, wherein the first bundle of data is selected according to bundle priority and respective type of node of the one or more neighbor nodes.

3. The method according to claim 1, wherein the bundle context information comprises any one of the following: an age in the network of each of the one or more bundles of data, an amount of time to live of each of the one or more bundles of data, and a total number of copies of each specific bundle of the one or more bundles of data currently residing within storage of the plurality of nodes of the network, and wherein the wireless network context information comprises a number of the neighbor nodes.

4. The method according to claim 1, wherein transmitting the bundle of data from the first node to the bundle destination via a neighbor node using the first wireless communication protocol takes into account a set of data dissemination rules for a direction of communication of bundles in the network, and wherein the data dissemination rules are received by the first node from the Cloud-based system.

5. The method according to claim 4, wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network, wherein the upstream direction is towards the Cloud-based system and the downstream direction is away from the Cloud-based system.

6. The method according to claim 1, wherein the type of neighbor node comprises one of at least two types of nodes comprising a node of a first type that is located at a fixed geographic location, and a node of a second type that is part of a vehicle that acts as a mobile access point configured to wirelessly communicate via the network, data of end-user devices accessing the network via the mobile access point.

7. The method according to claim 1, wherein transmitting the first bundle of data to the bundle destination comprises determining that a number of available wireless communication links at the first node is two or more, based on the wireless network context information indicative of quality of a wireless signal received from the neighbor node.

8. The method according to claim 7, wherein transmitting the first bundle of data from the first node to the bundle destination comprises routing a copy of the first bundle of data through two or more neighbor nodes to the bundle destination of the first bundle.

9. A non-transitory computer-readable medium having a plurality of code sections, each code section storing a plurality of instructions executable by one or more processors to cause the one or more processors to perform a method of managing scheduling and prioritizing of data by nodes of a wireless network comprising a plurality of nodes and a Cloud-based system, the steps of the method comprising:
analyzing wireless network context information for a first node of the plurality of nodes, wherein the wireless network context information comprises information identifying each node of the plurality of nodes that is a neighbor node in direct wireless communication range of the first node using a first wireless communication protocol, a respective indication of quality of a wireless signal received from the neighbor node, and a respective type of the neighbor node;
determining, based on analysis of the wireless network context information, whether there are currently one or more neighbor nodes of the plurality of nodes that are within direct wireless communication range of the first node for the first wireless communication protocol;
when the first node is within direct wireless communication range of at least one neighbor node:
selecting a first bundle of data;
transmitting, by the first node, the first bundle of data to the at least one neighbor node using the first wireless communication protocol; and
when the first node is not within direct wireless communication range of another node of the plurality of nodes:
selecting a second bundle of data;
examining bundle context information for the second bundle of data, wherein the bundle context information comprises at least a bundle priority and a bundle destination;
determining based on the examining one or more conditions for using an alternate communication network in transmitting the second bundle of data; and
when at least one condition is met, transmitting, by the first node, the second bundle of data to the bundle destination using a second wireless communication protocol associated with the alternate communication network.

10. The non-transitory computer-readable medium according to claim 9, wherein the first bundle of data is selected according to bundle priority and respective type of node of the one or more neighbor nodes.

11. The non-transitory computer-readable medium according to claim 9, wherein the bundle context information comprises any one of the following: an age in the network of each of the one or more bundles of data, an amount of time to live of each of the one or more bundles of data, and a total number of copies of each specific bundle of the one or more bundles of data currently residing within storage of the plurality of nodes of the network, and wherein the wireless network context information comprises a number of the neighbor nodes.

12. The non-transitory computer-readable medium according to claim 9, wherein transmitting the bundle of data from the first node to the bundle destination via a neighbor node using the first wireless communication protocol takes into account a set of data dissemination rules for a direction of communication of bundles in the network, and wherein the data dissemination rules are received by the first node from the Cloud-based system.

13. The non-transitory computer-readable medium according to claim 12, wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network, wherein the upstream direction is towards the Cloud-based system and the downstream direction is away from the Cloud-based system.

14. The non-transitory computer-readable medium according to claim 9, wherein the type of neighbor node comprises one of at least two types of nodes comprising a node of a first type that is located at a fixed geographic location, and a node of a second type that is part of a vehicle that acts as a mobile access point configured to wirelessly communicate via the network, data of end-user devices accessing the network via the mobile access point.

15. The non-transitory computer-readable medium according to claim 9, wherein transmitting the first bundle of data to the bundle destination comprises determining that a number of available wireless communication links at the first node is two or more, based on the wireless network context information indicative of quality of a wireless signal received from the neighbor node.

16. The non-transitory computer-readable medium according to claim 15, wherein transmitting the first bundle of data from the first node to the bundle destination comprises routing a copy of the first bundle of data through two or more neighbor nodes to the bundle destination of the first bundle.

17. A system for managing scheduling and prioritizing of data by a node of a wireless network comprising a plurality of nodes and a Cloud-based system, the system comprising:
a first node comprising one or more processors operatively coupled to storage configured for storing one or more bundles of data, wherein the one or more processors are configured to:
analyze wireless network context information for the first node, wherein the wireless network context information comprises information identifying each node of the plurality of nodes that is a neighbor node in direct wireless communication range of the first node using a first wireless communication protocol, a respective indication of quality of a wireless signal received from the neighbor node, and a respective type of the neighbor node;

determine, based on analysis of the wireless network context information, whether there are currently one or more neighbor nodes of the plurality of nodes that are within direct wireless communication range of the first node for the first wireless communication protocol;

when the first node is within direct wireless communication range of at least one neighbor node:
select a first bundle of data;
transmit the first bundle of data to the at least one neighbor node using the first wireless communication protocol;

when the first node is not within direct wireless communication range of another node of the plurality of nodes:
select a second bundle of data;
examine bundle context information for the second bundle of data, wherein the bundle context information comprises at least a bundle priority and a bundle destination;
determine based on the examining one or more conditions for using an alternate communication network in transmitting the second bundle of data; and
when at least one condition is met, transmit the second bundle of data to the bundle destination using a second wireless communication protocol associated with the alternate communication network.

18. The system according to claim 17, wherein the first bundle of data is selected according to bundle priority and respective type of node of the one or more neighbor nodes.

19. The system according to claim 17, wherein the bundle context information comprises any one of the following: an age in the network of each of the one or more bundles of data, an amount of time to live of each of the one or more bundles of data, and a total number of copies of each specific bundle of the one or more bundles of data currently residing within storage of the plurality of nodes of the network, and wherein the wireless network context information comprises a number of the neighbor nodes.

20. The system according to claim 17, wherein transmitting the bundle of data from the storage of the first node to the bundle destination via a neighbor node using the first wireless communication protocol takes into account a set of data dissemination rules for a direction of communication of bundles in the network, and wherein the data dissemination rules are received by the first node from the Cloud-based system.

21. The system according to claim 20, wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network, wherein the upstream direction is towards the Cloud-based system and the downstream direction is away from the Cloud-based system.

22. The system according to claim 17, wherein the type of neighbor node comprises one of at least two types of nodes comprising a node of a first type that is located at a fixed geographic location, and a node of a second type that is part of a vehicle that acts as a mobile access point configured to wirelessly communicate via the network, data of end-user devices accessing the network via the mobile access point.

23. The system according to claim 17, wherein transmitting the first bundle of data to the bundle destination comprises determining that a number of available wireless communication links at the first node is two or more, based on the wireless network context information indicative of quality of a wireless signal received from the neighbor node.

24. The system according to claim 23, wherein transmitting the first bundle of data from the first node to the bundle destination comprises routing a copy of the first bundle of data through two or more neighbor nodes to the bundle destination of the first bundle.

25. The method according to claim 1, wherein the type of the neighbor node indicates at least whether the respective neighbor node originated the data sent by the respective neighbor node.

* * * * *